(12) United States Patent
Li et al.

(10) Patent No.: US 10,601,558 B2
(45) Date of Patent: Mar. 24, 2020

(54) METHOD AND SYSTEM FOR FLEXIBLE SOUNDING REFERENCE SIGNAL (SRS) TRANSMISSION IN A WIRELESS COMMUNICATION NETWORK

(71) Applicant: Telefonaktiebolaget LM Ericsson (publ), Stockholm (SE)

(72) Inventors: Gen Li, Beijing (CN); Shaohua Li, Beijing (CN); Jianfeng Wang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/544,215

(22) PCT Filed: Jul. 5, 2017

(86) PCT No.: PCT/CN2017/091824
§ 371 (c)(1),
(2) Date: Jul. 17, 2017

(87) PCT Pub. No.: WO2019/006695
PCT Pub. Date: Jan. 10, 2019

(65) Prior Publication Data
US 2019/0013909 A1 Jan. 10, 2019

(51) Int. Cl.
*H04W 4/00* (2018.01)
*H04L 5/00* (2006.01)
(Continued)

(52) U.S. Cl.
CPC .......... *H04L 5/0048* (2013.01); *H04B 1/713* (2013.01); *H04L 5/005* (2013.01); *H04W 74/0808* (2013.01)

(58) Field of Classification Search
CPC ... H04L 5/0048; H04W 74/0808; H04B 1/712
See application file for complete search history.

(56) References Cited

U.S. PATENT DOCUMENTS

2012/0014349 A1* 1/2012 Chung ................ H04B 7/0684
370/329
2015/0009951 A1* 1/2015 Josiam ................ H04L 25/0224
370/330

(Continued)

FOREIGN PATENT DOCUMENTS

| EP | 2579659 A1 | 4/2013 |
|---|---|---|
| WO | 2014109686 A1 | 7/2014 |
| WO | 2017050017 A1 | 3/2017 |

OTHER PUBLICATIONS

Huawei et al., "UL beam management," 3GPP TSG RAN WG1 Meeting #88b, R1-1704231, Apr. 7, 2017, 7 pages.
(Continued)

*Primary Examiner* — Bo Hui A Zhu
(74) *Attorney, Agent, or Firm* — Nicholson De Vos Webster & Elliott LLP

(57) ABSTRACT

Embodiments of the invention include methods of providing flexible sounding reference signal (SRS) transmission in a wireless communication network. In one embodiment, a method is implemented in a network device for configuring sounding reference signal (SRS) transmission from a terminal device to the network device, the method comprises: transmitting, by a network device to a terminal device, an indication of a plurality of alternative SRS transmission selections; and detecting, by the network device from a signal of the terminal device, a SRS transmission based on the plurality of alternative SRS transmission selections.

28 Claims, 15 Drawing Sheets

(51) Int. Cl.
   *H04B 1/713*   (2011.01)
   *H04W 74/08*   (2009.01)

(56) References Cited

U.S. PATENT DOCUMENTS

| | | | |
|---|---|---|---|
| 2016/0100407 A1* | 4/2016 | Gaal | H04W 72/0453 |
| | | | 370/329 |
| 2017/0223677 A1* | 8/2017 | Dinan | H04W 72/042 |
| 2017/0230997 A1* | 8/2017 | Damnjanovic | H04L 5/005 |
| 2018/0076946 A1* | 3/2018 | Li | H04L 5/001 |
| 2019/0215110 A1* | 7/2019 | Yang | H04L 5/005 |

OTHER PUBLICATIONS

International Search Report and Written Opinion for Application No. PCT/CN2017/091824, dated Mar. 27, 2018, 9 pages.
International Preliminary Report on Patentability (Chapter II of the Patent Cooperation Treaty), PCT App. No. PCT/CN2017/091824, Oct. 28, 2019, 5 pages.

* cited by examiner

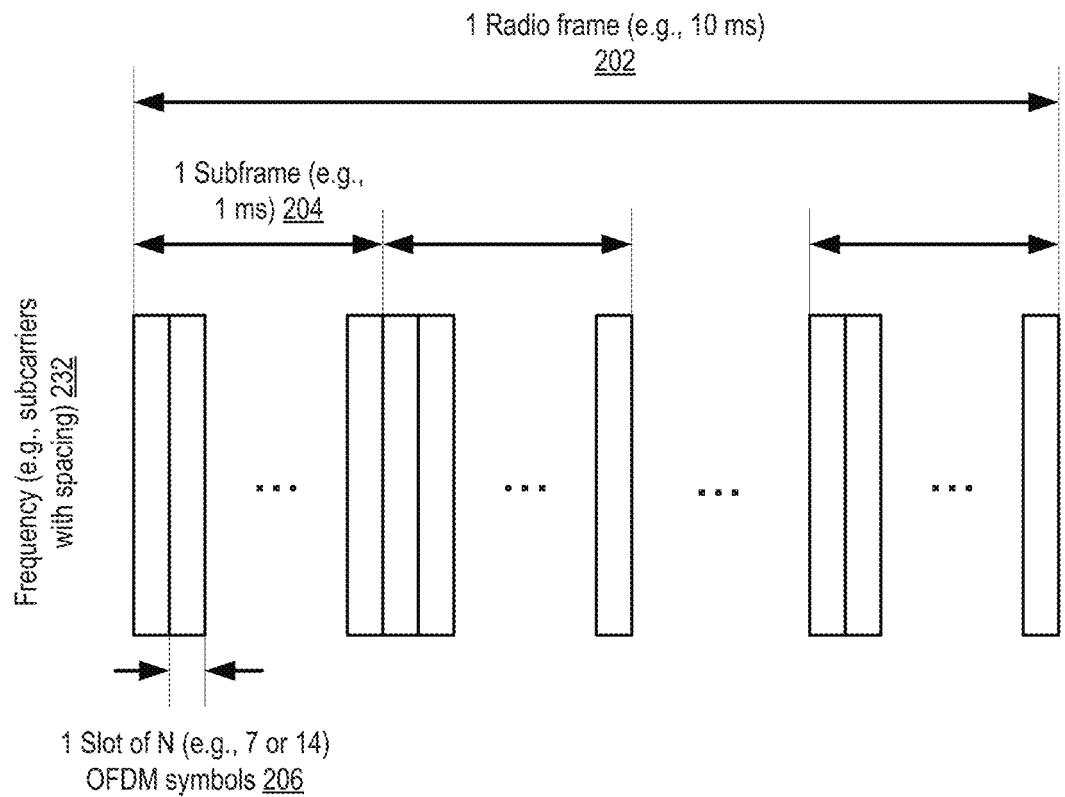
FIG. 2A
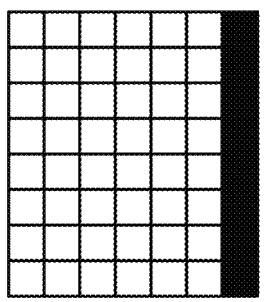 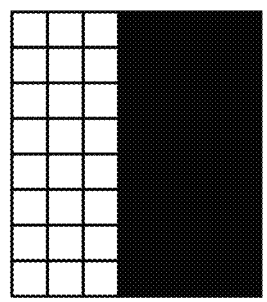 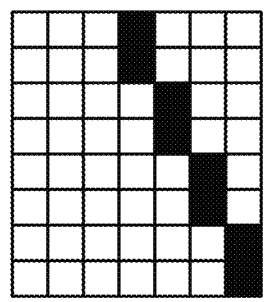
FIG. 2B

0 1 2 3 4 5 6

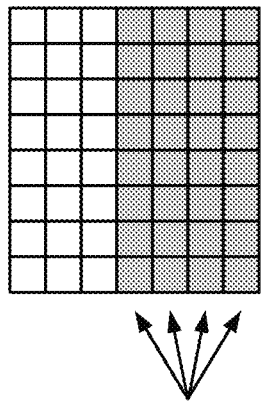

Consecutive symbol candidates within one slot for SRS transmission for one-port UE. 552

0 1 2 3 4 5 6

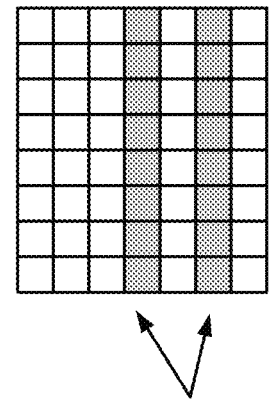

Discontinuous symbol candidates within one slot for SRS transmission for the one-port UE. 554

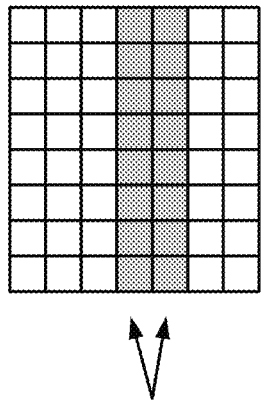

First candidate within one slot for SRS transmission in a two-port UE: Port #0 transmits at Symbol #3 and Port #1 transmit at Symbol #4 (number of symbol candidates larger than the number of ports). 652

0 1 2 3 4 5 6

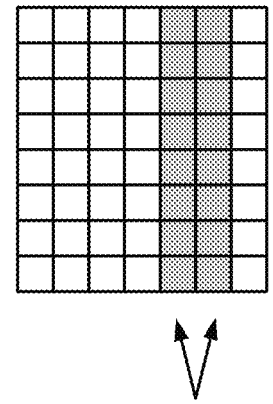

Second candidate within one slot for SRS transmission in a two-port UE: Port #0 transmits at Symbol #4 and Port #1 transmit at Symbol #5 (number of symbol candidates larger than the number of ports). 654

FIG. 6

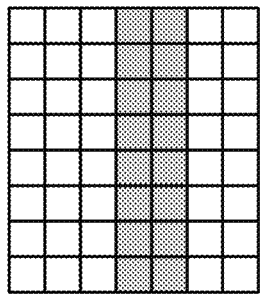
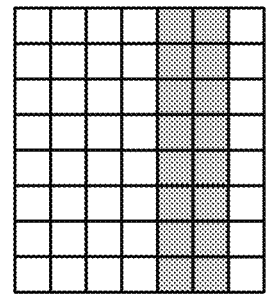

0 1 2 3 4 5 6    0 1 2 3 4 5 6

First candidate within one slot for SRS transmission in a four-port UE: Each Port transmits using a portion (e.g., half) of RBs in Symbols #3 or 4 (number of symbol candidates less than the number of ports). 752

Second candidate within one slot for SRS transmission in a four-port UE: Each Port transmits using a portion (e.g., half) of RBs in Symbols #4 or 5 (number of symbol candidates less than the number of ports). 754

FIG. 7

SRS transmission configuration table 802

| Selections/ Ports | Port #0 | Port #1 |
|---|---|---|
| SRS Tans. Selection #1 | Symbol #3 | Symbol #4 |
| SRS Tans. Selection #2 | Symbol #4 | Symbol #5 |

FIG. 8A

SRS transmission configuration table 804

| Selections/ Ports | Port #0 | Port #1 | Port #2 | Port #3 |
|---|---|---|---|---|
| SRS Tans. Selection #1 | Symbol #3, subcarriers 0-299 | Symbol #3, subcarriers 300-599 | Symbol #4, subcarriers 0-299 | Symbol #4, subcarriers 300-599 |
| SRS Tans. Selection #2 | Symbol #4, subcarriers 0-299 | Symbol #4, subcarriers 300-599 | Symbol #5, subcarriers 0-299 | Symbol #5, subcarriers 300-599 |

FIG. 8B

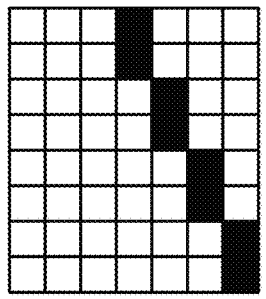

Partial-band frequency hopping SRS transmission within one slot for one-port UE: LBT succeeds at Symbol #3). 1152

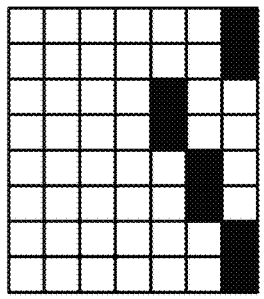

Partial-band frequency hopping SRS transmission within one slot for one-port UE: LBT fails at Symbol #3 but succeeds at Symbol #4. 1154

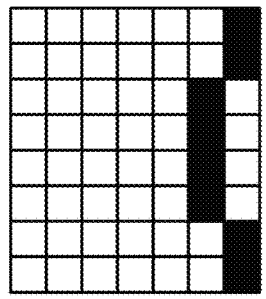

Partial-band frequency hopping SRS transmission within one slot for one-port UE: LBT fails at Symbol #3, #4, but succeeds at Symbol #5. 1156

FIG. 11

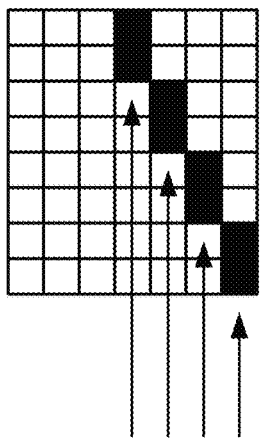

P P P P
# # #
0 1 2 3

Partial-band SRS transmission within one slot for 4-port UE: LBT succeeds at Symbol #3 (all 4 ports transmit SRS signals). 1252

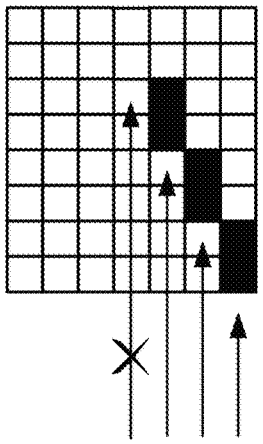

P P P P
# # #
0 1 2 3

Partial-band SRS transmission within one slot for 4-port UE: LBT fails at Symbol #3, succeeds at Symbol #4 (remaining 3 ports transmit SRS signals). 1254

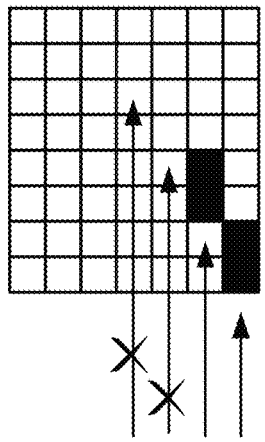

P P P P
# # #
0 1 2 3

Partial-band SRS transmission in one slot for 4-port UE: LBT fails at Symbol #3, #4, succeeds at Symbol #5 (remaining 2 ports transmit SRS signals). 1256

FIG. 12

METHOD AND SYSTEM FOR FLEXIBLE SOUNDING REFERENCE SIGNAL (SRS) TRANSMISSION IN A WIRELESS COMMUNICATION NETWORK

CROSS-REFERENCE TO RELATED APPLICATIONS

This application is a National stage of International Application No. PCT/CN2017/091824, filed Jul. 5, 2017, which is hereby incorporated by reference.

TECHNICAL FIELD

Embodiments of the invention relate to the field of wireless communications, and more specifically, relate to a method and system for providing flexible sounding reference signal (SRS) transmission in a wireless communication network.

BACKGROUND

Sounding reference signal (SRS) is an uplink reference signal transmitted from a terminal device (e.g., a user equipment (UE)) to a network device (e.g., a base station). A SRS may be used by the network device to determine the channel quality of the uplink path from the terminal device to the network device. The channel quality determination may be referred to as channel estimation. The network device often allocates a portion of system bandwidth for a specific terminal device at a specific time, and the network device may select the best bandwidth for the terminal device based on the SRS transmitted by the terminal device.

The network device may also use SRS for uplink timing estimation as a part of timing alignment procedure, particularly when there is no physical uplink shared channel (PUSCH) or physical uplink control channel (PUCCH) transmissions for an extended period.

Several types of SRS transmissions are defined in literature. For example, the long-term evolution (LTE) defines single SRS transmissions, periodic SRS transmissions, and aperiodic SRS transmissions. The network device typically provides type(s) and timing of SRS transmissions to the terminal device, and the information provided by the network device regarding SRS transmission is often referred to as SRS transmission configuration.

SRS transmission configuration may dictate that SRS be transmitted at a specific position in a signal transmission hierarchy, e.g., the last symbol of an uplink slot. In some scenarios, a terminal device may transmit a SRS only when the terminal device wins a resource competition in a contention-based protocol (e.g., listen-before-talk, LBT). In these and other scenarios, such singular SRS transmission configuration may be inefficient.

SUMMARY

Embodiments of the invention include methods of providing flexible sounding reference signal (SRS) transmission in a wireless communication network. In one embodiment, a method is implemented in a network device for configuring sounding reference signal (SRS) transmission from a terminal device to the network device, the method comprises: transmitting, by a network device to a terminal device, an indication of a plurality of alternative SRS transmission selections; and detecting, by the network device from a signal of the terminal device, a SRS transmission based on the plurality of alternative SRS transmission selections.

Regarding the method implemented in the network device, one or more embodiments may be implemented. In one embodiment, the method further comprises obtaining, by the network device, a measurement from the SRS transmission for an uplink from the terminal device to the network device. In one embodiment, one of the plurality of alternative SRS transmission selections indicts one or more symbols in a time unit through which the SRS is to be transmitted. In one embodiment, the plurality of alternative SRS transmission selections includes consecutive symbols in the time unit through which the SRS is to be transmitted. In one embodiment, the plurality of the alternative SRS transmission selections are selected based on configuration of the terminal device. In one embodiment, one of the plurality of alternative SRS transmission selections indicts one or more subcarriers in frequency domain within a symbol through which the SRS is to be transmitted. In one embodiment, the detection of the SRS transmission from the signal comprises examining existence of a SRS transmission selection within the plurality of alternative SRS transmission selections ordered in time or frequency domain. In one embodiment, the detecting comprises: determining whether the SRS transmission is detected in a first SRS transmission selection within the plurality of alternative SRS transmission selections; and upon the SRS transmission not being detected, selecting a second SRS transmission selection, immediately next to the first SRS transmission selection in order of the time or frequency domain, within the plurality of alternative SRS transmission selections.

In one embodiment, a method is implemented in a terminal device for sounding reference signal (SRS) transmission from the terminal device to a network device, the method comprising: receiving, by the terminal device from the network device, an indication of a plurality of alternative SRS transmission selections; and transmitting, by the terminal device to the network device, a SRS through one or more antenna ports of the terminal device based on the plurality of alternative SRS selections and a determination of success in a contention-based protocol in a time unit, where the SRS is transmitted using one of the plurality of alternative SRS selections.

Regarding the method implemented in the terminal device, one or more embodiments may be implemented. In one embodiment, the determination of success in the contention-based protocol is a determination of a successful listen-before-talk (LBT). In one embodiment, a failed LBT in the time unit precedes the successful LBT in the time unit, and the failed LBT corresponds to a first alternative SRS transmission selection, and where the successful LBT corresponds to a second alternative SRS transmission selection immediately next to the first alternative SRS transmission selection. In one embodiment, the terminal device contains a plurality of antenna ports, and one of the plurality of alternative SRS transmission selections indicates that one antenna port selects one symbol from multiple symbols for the SRS transmission. In one embodiment, the terminal device contains a plurality of antenna ports, and one of the plurality of alternative SRS transmission selections indicates that one antenna port selects one or more subcarriers within a symbol for the SRS transmission. In one embodiment, the terminal device contains a plurality of antenna ports, and where the SRS transmission is performed only through one or more antenna ports that an associated LBT is successful.

Embodiments of the invention include apparatus for providing flexible sounding reference signal transmission in a wireless communication network. In one embodiment, a network device is disclosed to configure sounding reference signal (SRS) transmission from a terminal device to the network device, the network device comprising: a non-transitory machine-readable storage medium to store instructions; and a processor coupled with the non-transitory machine-readable storage medium to process the stored instructions, causing the network device to perform operations. The operations are to: transmit to the terminal device, an indication of a plurality of alternative SRS transmission selections; and detect from a signal of the terminal device, a SRS transmission based on the plurality of alternative SRS transmission selections.

In one embodiment, the operations of the network device are further to: obtain a measurement from the SRS transmission for an uplink from the terminal device to the network device. In one embodiment, one of the plurality of alternative SRS transmission selections indicts one or more symbols in a time unit through which the SRS is to be transmitted. In one embodiment, the plurality of alternative SRS transmission selections are consecutive symbols in the time unit through which the SRS is to be transmitted. In one embodiment, the plurality of the alternative SRS transmission selections are selected based on configuration of the terminal device. In one embodiment, one of the plurality of alternative SRS transmission selections indicts one or more subcarriers in frequency domain within a symbol through which the SRS is to be transmitted. In one embodiment, the detection of the SRS transmission from the signal comprises examining existence of a SRS transmission selection within the plurality of alternative SRS transmission selections ordered in time or frequency domain. In one embodiment, the detection is to: determine whether the SRS transmission is detected in a first SRS transmission selection within the plurality of alternative SRS transmission selections; and upon the SRS transmission not being detected, select a second SRS transmission selection, immediately next to the first SRS transmission selection in order of the time or frequency domain, within the plurality of alternative SRS transmission selections.

In one embodiment, a terminal device is disclosed to perform sounding reference signal (SRS) transmission to a network device, the terminal device comprising: a non-transitory machine-readable storage medium to store instructions; and a processor coupled with the non-transitory machine-readable storage medium to process the stored instructions, causing the network device to perform operations. The operations are to: receive from the network device, an indication of a plurality of alternative SRS transmission selections; and transmit to the network device, a SRS through one or more antenna ports of the terminal device based on the plurality of alternative SRS selections and a determination of success in a contention-based protocol in a time unit, where the SRS is transmitted using one of the plurality of alternative SRS selections.

Regarding the terminal device, one or more embodiments may be implemented. In one embodiment, the determination of success in the contention-based protocol is a determination of a successful listen-before-talk (LBT). In one embodiment, a failed LBT in the time unit precedes the successful LBT in the time unit, and the failed LBT corresponds to a first alternative SRS transmission selection, and where the successful LBT corresponds to a second alternative SRS transmission selection immediately next to the first alternative SRS transmission selection. In one embodiment, the terminal device contains a plurality of antenna ports, and one of the plurality of alternative SRS transmission selections indicates multiple symbols for SRS transmission, each symbol corresponds to one antenna port. In one embodiment, the terminal device contains the plurality of antenna ports, and one of the plurality of alternative SRS transmission selections corresponds to one or more subcarriers within one symbol to be transmitted for the SRS transmission through an antenna port. In one embodiment, the terminal device contains the plurality of antenna ports, and where the SRS transmission is performed only through one or more antenna ports that an associated LBT is successful.

Embodiments of the invention include non-transitory machine-readable storage media for providing flexible sounding reference signal transmission in a wireless communication network. In one embodiment, a non-transitory machine-readable storage medium that provides instructions is disclose. The instructions, when executed by a processor of a network device, cause the processor to perform operations comprising: transmitting, by the network device to the terminal device, an indication of a plurality of alternative SRS transmission selections; and detecting, by the network device from a signal of the terminal device, a SRS transmission based on the plurality of alternative SRS transmission selections.

In one embodiment, a non-transitory machine-readable storage medium that provides instructions is disclose. The instructions, when executed by a processor of a network device, cause the processor to perform operations comprising: receiving, by the terminal device from the network device, an indication of a plurality of alternative SRS transmission selections; and transmitting, by the terminal device to the network device, a SRS through one or more antenna ports of the terminal device based on the plurality of alternative SRS selections and a determination of success in a contention-based protocol in a time unit, where the SRS is transmitted using one of the plurality of alternative SRS selections.

Embodiments of the invention include methods of providing flexible sounding reference signal (SRS) transmission in a wireless communication network. In one embodiment, a method is implemented for sounding reference signal (SRS) transmission from a terminal device to a network device, the method comprising: receiving (1602), by the terminal device from the network device, an indication of SRS selection; and transmitting, by the terminal device to the network device, a SRS through one or more antenna ports of the terminal device based on the SRS selection and a determination of success in a contention-based protocol in a time unit.

Regarding the method implemented in the terminal device, one or more embodiments may be implemented. In one embodiment, the determination of success in the contention-based protocol is a determination of a successful listen-before-talk (LBT). In one embodiment, the indication of SRS selection includes frequency hopping of a plurality of frequency ranges. In one embodiment, a failed LBT corresponding to a frequency range uses a first symbol within the time unit, and the failed LBT causes a second symbol within the time unit to be selected to perform a LBT again corresponding to the frequency range. In one embodiment, the second symbol within the time unit is selected to maintain frequency range continuity in the SRS transmission. In one embodiment, the SRS transmission comprises: transmitting the SRS, by matching the one or more antenna ports with one or more symbols that succeed in LBT. In one embodiment, the SRS transmission comprises: transmitting the SRS with adjusted width of beams through one or more antenna ports.

In one embodiment, a terminal device is disclosed to perform sounding reference signal (SRS) transmission to a network device, the terminal device comprising: a non-transitory machine-readable storage medium to store instructions; and a processor coupled with the non-transitory machine-readable storage medium to process the stored instructions, causing the network device to perform operations. The operations are to: receive from the network device, an indication of SRS selection; and transmit to the network device, a SRS through one or more antenna ports of the terminal device based on the indication and a determination of success in a contention-based protocol in a time unit.

Regarding the terminal device, one or more embodiments may be implemented. In one embodiment, the determination of success in the contention-based protocol is a determination of a successful listen-before-talk (LBT). In one embodiment, the indication of SRS selection includes frequency hopping of a plurality of frequency ranges. In one embodiment, a failed LBT corresponding to a frequency range uses a first symbol within the time unit, and the failed LBT causes a second symbol within the time unit to be selected to perform a LBT again corresponding to the frequency range. In one embodiment, the second symbol within the time unit is selected to maintain frequency range continuity in the SRS transmission. In one embodiment, the SRS transmission by the terminal device is to: transmit the SRS, by matching the one or more antenna ports with one or more symbols that succeed in LBT. In one embodiment, the SRS transmission by the terminal device is to: transmit the SRS with adjusted width of beams by one or more antenna ports.

In one embodiment, a non-transitory machine-readable storage medium that provides instructions is disclose. The instructions, when executed by a processor of a network device, cause the processor to perform operations comprising: receiving, by the terminal device from the network device, an indication of SRS selection; and transmitting, by the terminal device to the network device, a SRS through one or more antenna ports of the terminal device based on the indication and a determination of success in a contention-based protocol in a time unit.

Embodiments of the invention offer efficient ways for a terminal device to perform SRS transmission to a network device, and the terminal device may utilize its resources better based on SRS transmission configuration from the network device.

BRIEF DESCRIPTION OF THE DRAWINGS

The invention may best be understood by referring to the following description and accompanying drawings that illustrate embodiments of the invention. In the drawings:

FIG. 2A illustrates an exemplary signal transmission hierarchy.

FIG. 2B illustrates SRS transmission configurations for terminal devices.

FIG. 5 illustrates alternative SRS transmission selections within one slot for one-port UE per embodiments of the invention.

FIG. 6 illustrates alternative SRS transmission selections within one slot for a multi-port UE when the number of symbol candidates is larger than or equal to the number of ports per embodiments of the invention.

FIG. 7 illustrates alternative SRS transmission selections within one slot for a multi-port UE when the number of symbol candidates is less than the number of ports per embodiments of the invention.

FIG. 8A illustrates a SRS transmission configuration table including alternative SRS transmission selections within one slot for a multi-port UE when the number of symbol candidates is larger than or equal to the number of ports per embodiments of the invention.

FIG. 8B illustrates a SRS transmission configuration table including alternative SRS transmission selections within one slot for a multi-port UE when the number of symbol candidates is less than the number of ports per embodiments of the invention.

FIG. 11 illustrates SRS transmission for a one-port UE per embodiments of the invention.

FIG. 12 illustrates SRS transmission for a multi-port UE per a first embodiment of the invention.

DETAILED DESCRIPTION

Figure 1A:
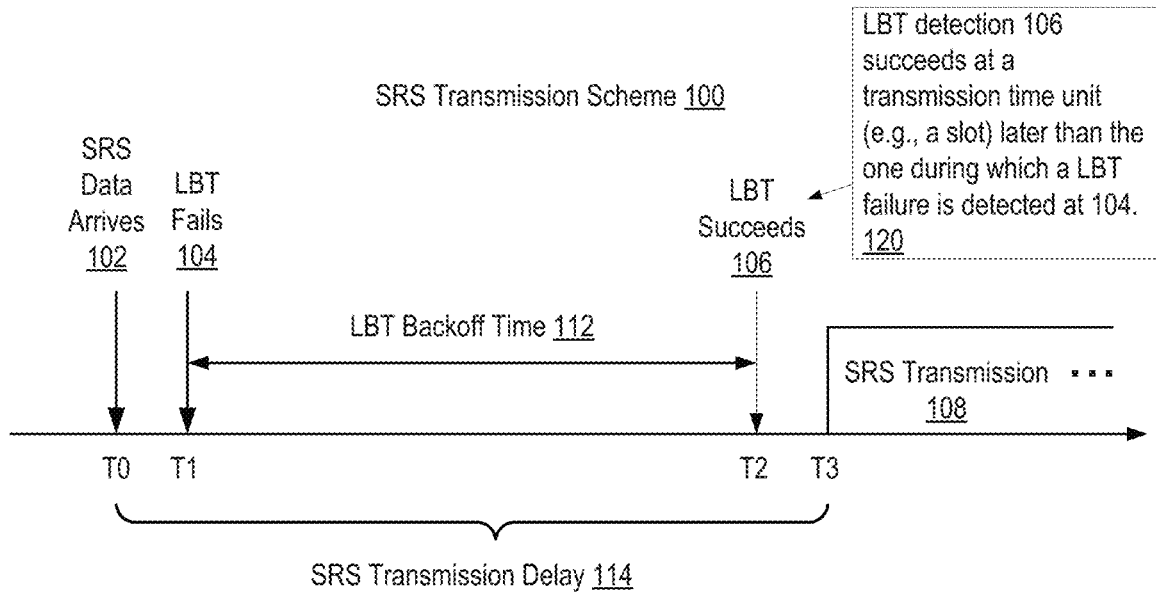
FIG. 1A illustrates SRS transmission in a wireless communication network.

The following description describes methods and apparatus for providing flexible sounding reference signal (SRS) transmission in a wireless communication network. In the following description, numerous specific details such as logic implementations, opcodes, means to specify operands, resource partitioning/sharing/duplication implementations, types and interrelationships of system components, and logic partitioning/integration choices are set forth to provide a more thorough understanding of the present invention. One skilled in the art will appreciate, however, that the invention may be practiced without such specific details. In other instances, control structures, gate level circuits and full software instruction sequences have not been shown in detail in order not to obscure the invention. Those of ordinary skill in the art, with the included descriptions, will be able to implement proper functionality without undue experimentation.

Bracketed text and blocks with dashed borders (such as large dashes, small dashes, dot-dash, and dots) may be used to illustrate optional operations that add additional features to the embodiments of the invention. Such notation, however, should not be taken to mean that these are the only options or optional operations, and/or that blocks with solid borders are not optional in some embodiments of the invention.

Terms

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radiofrequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to a NIC. One or more parts of an embodiment of the invention may be implemented using different combinations of software, firmware, and/or hardware.

A wireless communication network is a network of electronic devices communicating using radio waves (electromagnetic waves within the frequencies 30 KHz-300 GHz). A wireless communication may follow wireless communication standards, such as new radio (NR), LTE-Advanced (LTE-A), LTE, wideband code division multiple access (WCDMA), High-Speed Packet Access (HSPA). Furthermore, the communications between the electronic devices such as network devices and terminal devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future.

A network device (ND) is an electronic device in a wireless communication network via which a terminal device accesses the network and receives services therefrom. The network device may refer to a base station (BS) or an access point (AP), for example, a node B (NodeB or NB), an evolved NodeB (eNodeB or eNB), a next generation node B (gNB), remote radio unit (RRU), a radio header (RH), a remote radio head (RRH), a relay, and a low power node such as a femtocell and a picocell.

A terminal device is an electronic device that may access a wireless communication network and receive services from the wireless communication network. For example, a terminal device may be a user equipment (UE), which may be a subscriber station (SS), a portable subscriber Station, a mobile station (MS), or an access terminal (AT). The terminal device may be one of a mobile phone, a cellular phone, a smart phone, a tablet, a wearable device, a personal digital assistant (PDA), a portable computer, an image capture terminal device such as a digital camera, a gaming terminal device, a music storage and playback appliance, a vehicle-mounted wireless terminal device, a smart speaker, a set-top box.

A contention-based protocol (CBP) is a protocol that allows multiple users to share the same spectrum by defining the events that must occur when two or more transmitters attempt to simultaneously access the same channel and establishing rules by which a transmitter provides reasonable opportunities for other transmitters to operate. Such a protocol may consist of procedures for initiating new transmissions, procedures for determining the state of the channel (available or unavailable), and procedures for managing retransmissions in the event of a busy channel. The content-based protocol includes listen-before-talk (LBT), Aloha protocol, multiple access with collision avoidance (MACA), carrier sense multiple access (CSMA), distributed coordination function (DCF), point coordination function (PCF), and the derivatives/enhancements of these examples.

An antenna port may or may not correspond to a physical antenna. The antenna port may be logical entities distinguished by their reference signal sequences. Multiple antenna port signals may be transmitted on a single transmit antenna, and a single antenna port may be spread across multiple transmit antennas.

Wireless Communication Network Implementing SRS and Contention-Based Protocol

A wireless communication network may use a contention-based protocol and sounding reference signal (SRS) for uplink channel estimation. For example, a new radio (NR) system may operate in either licensed exclusive bands or unlicensed bands (especially ones for enterprise solutions). To operate in an unlicensed band and use a SRS, a wireless communication network often implements a contention-based protocol (e.g., LBT), and once a terminal device succeeds in the contention-based protocol, the terminal device may transmit the SRS. The following discussion uses LBT as an example of the contention-based protocol, and a person of ordinary skill in the art understands embodiments of the inventions may implement another contention-based protocol instead of LBT.

SRS is essential for several procedures in a wireless communication network. For example, scheduling, uplink/downlink adaption, and timing estimation use SRS; additionally, a NR system may use SRS for reciprocity-based precoding design for massive multiple input multiple output (MIMO) and uplink beam management. These procedures can have significantly different requirements on the channel estimation and/or time estimation, which the network device may rely on the SRS to derive. Additionally, terminal devices with multiple antenna ports (referred to multi-port terminal device) such as multi-port UEs are gaining popularity. A network device needs to understand a terminal device's hardware configuration and corresponding beamforming capabilities of the multiple antenna ports, which the network device may also rely on the SRS to obtain. Thus, a network device may prefer to obtain timely SRS transmission from a terminal device.

A network device may configure SRS transmission of a terminal device. SRS configuration may include "trigger type 0" SRS transmission that may be a single SRS or periodic SRS transmission. Radio resource control (RRC) signaling may configure the trigger type 0 transmission. SRS configuration may include "trigger type 1" SRS transmission that may be aperiodic SRS transmission configured also by RRC signaling and triggered by downlink control information (DCI). Trigger types 0 and 1 and the associated single, periodic, and aperiodic SRS transmissions are known in the art thus are not explained herein.

FIG. 1A illustrates SRS transmission in a wireless communication network. The contention-based protocol in this example is LBT. A terminal device obtains SRS data arrives at 102 for transmission, and the arrival time is denoted as T0. The terminal device listens to check status of an uplink channel before it transmits the SRS to a corresponding network device. The default mode of the LBT is not-to-send, and the SRS is transmitted only when the uplink channel is determined to be available. "Available" means that a planned transmission in the uplink channel will neither interfere nor be interfered by a current ongoing transmission. Herein, "listen" may also be referred to as "sense" or "detect."

In one example, when the uplink channel is determined to be available (thus LBT succeeds), the terminal device may transmit data including the SRS after a DIFS (distributed coordinator function inter frame space) time period. Once the terminal device finishes transmitting the data, the terminal device may transmit an acknowledgement after a short inter-frame space (SIFS) time period.

In the same example, if the uplink is determined not available (thus LBT fails), however, the terminal device may defer the data transmission. The terminal device may start a back-off counter, and after back-off counter expires, the terminal device listens to the uplink channel again to determine the channel's availability. If the uplink channel is available (thus LBT succeeds), the terminal device may transmit after the DIFS; otherwise the back-off counter counts again to defer the data transmission. The process continues until the terminal device determines that the uplink is determined to be available.

A contention-based protocol such as a LBT procedure is vital in many scenarios. For example, a LBT procedure may be used for fair coexistence of unlicensed new radio (NR) system with several operators and technologies such as Wi-Fi (or wireless fidelity) and licensed-assisted access (LAA) operating in an unlicensed spectrum. A contention-based protocol may require an electronic device in a wireless communication network to perform a clear channel assessment when the electronic device attempts to transmit on a channel (e.g., one or more carriers) in an unlicensed spectrum. When the electronic device detects an energy level of the channel over a threshold, the electronic device determines the channel is not available. The energy level and other energy detection constraints may be imposed by standardization bodies such as the third-generation partnership project (3GPP) and national/international regulations (e.g., EU regulation and country specific regulations).

In FIG. 1A SRS transmission scheme 100, the terminal device determines that the uplink channel is unavailable at T1 as the LBT fails at time T1. The terminal device has one chance in a time unit (e.g., the last symbol of a slot) to determine the availability of the uplink channel. The terminal device then needs to wait for the LBT back-off time period 112 (e.g., the period to count down to expiration of the back-off counter) before listens again at time T2, when the LBT succeeds. Upon the successful LBT, the data including the SRS is transmitted at 108 (e.g., after a DIFS time period).

SRS transmission may follow several procedures. In one embodiment, a SRS may be sent through a physical uplink shared channel (PUSCH) signal, no LBT other than the one for the PUSCH signal is needed before the SRS transmission. When the SRS is sent without a PUSCH signal or is not followed immediately by a PUSCH signal, a LBT (25 microseconds one-shot LBT) is used if the SRS transmission is within a base station max channel occupancy time (MCOT); otherwise, a category 4-based LBT (LBT with random back-off with variable size of contention window) of a priority class (e.g., priority class 1) may be performed. In addition, in one embodiment, if an aperiodic SRS is followed by a PUSCH signal without a gap between the SRS and the following PUSCH signal, the terminal device performs LBT for the following PUSCH signal.

In the SRS transmission scheme 100, the SRS transmission delay is between T0 and T3 as illustrated at reference 114. The transmission delay may be long, and the communication between the terminal device and network device suffers when the network device does not receive timely channel/timing estimation information through the SRS transmission. Additionally, in the time unit (e.g., slot) scheduled to transmit the SRS, several additional resources (e.g., symbols) may be configured to support the planned SRS transmission. When the LBT fails and SRS can't be transmitted, the additional resources are wasted.

To reduce the long transmission delay, the terminal device may support only aperiodic SRS transmission, and another SRS is scheduled immediately if the network device detects that SRS is not available. The drawback is the additional signaling overhead and data resource waste for SRS resource reservation.

Figure 1B:
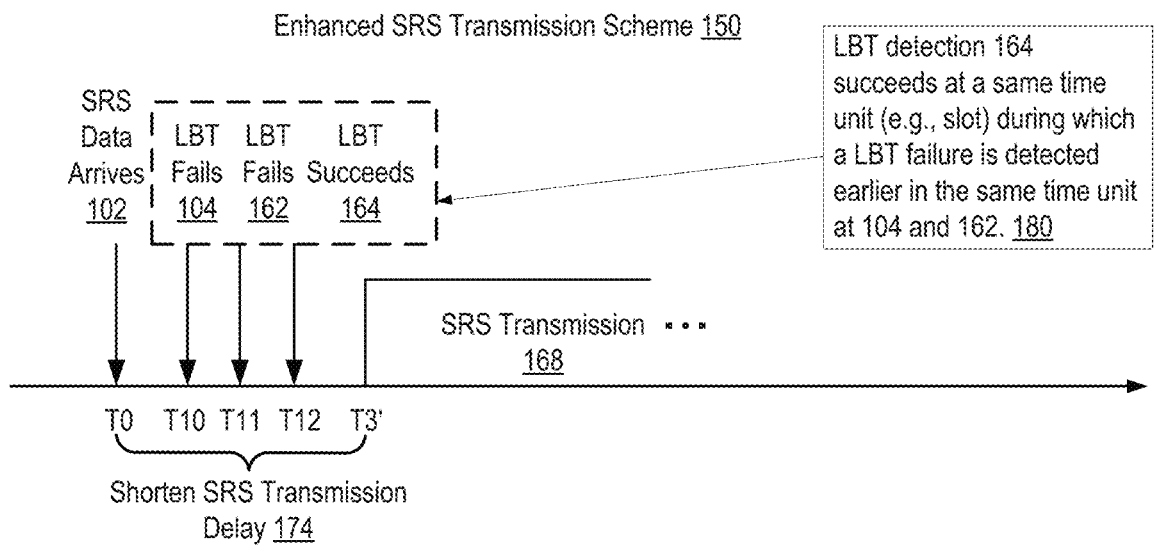
FIG. 1B illustrates SRS transmission in a wireless communication network per one embodiment of the invention.

FIG. 1B illustrates SRS transmission in a wireless communication network per one embodiment of the invention. The enhanced SRS transmission scheme 150 allows multiple alternative LBT detections within a time unit (e.g., the multiple symbols of a slot as candidates for LBT detection) as described at reference 180, rather than a single LBT detection within the time unit as described at reference 120.

At T10, the terminal device detects a LBT failure at reference 104 in a symbol of a time unit. Instead of waiting for a LBT back-off time period before listening again, the terminal device selects another symbol at time T11 within the same time unit to listen at reference 162, where another LBT failure is detected. Again, the terminal device selects a third symbol at time T12 within the same time unit to listen at reference 164. At reference 164, the LBT succeeds, and the terminal device may transmit the SRS at time T3'. Thus, the SRS transmission delay 174 is between time T1 and T3', and it is shortened to be less than the SRS transmission delay 114, despite two consecutive LBT failures (one more than the LBT failure in FIG. 1A).

By providing multiple options/selections for the SRS transmission within the same time unit, the enhanced SRS transmission scheme 150 offers a shorten delay for SRS transmission—the two failed LBTs at references 104 and 162 no longer causes two LBT back-off time periods, and the enhanced SRS transmission scheme 150 is preferable over the SRS transmission scheme 100.

SRS transmission complies with a signal transmission hierarchy in one embodiment. FIG. 2A illustrates an exemplary signal transmission hierarchy. The exemplary signal transmission hierarchy includes the transmission unit of frame such as radio frame 202. A radio frame 202 takes ten milliseconds to transmit in one embodiment. The frame may contain a number of subframes such as subframe 204. In this example, the radio frame 202 contains ten subframes, each takes one millisecond. Each subframe may contain a number of slots. For example, a subframe may contain two slots. Each slot such as the slot at reference 206 may contain a number of symbols. In one example, a slot contains either 7 or 14 symbols. The symbol is an orthogonal frequency-division multiplexing (OFDM) symbol in one embodiment.

The frame-subframe-slot-symbol hierarchy is an example of time domain hierarchy. In the frequency domain (as illustrated at reference 232), each symbol may be transmitted over a number of subcarriers. A symbol may be transmitted using a number of resource block (RB), each of which may contain 12 subcarriers in one embodiment. In one embodiment, each subcarrier includes a bandwidth (e.g., 7.5 kHZ or 15 kHZ) for transmission. One subcarrier×one symbol may be referred to as a resource element (RE), which is the smallest unit of resource to be allocated for signal transmission in one embodiment.

The illustrated frame structure offers an example for signal transmission. In this frame structure or other frame structures, a SRS transmission is performed at a lowest level of time unit (symbol level in this case), which is included in a time unit a level over the lowest level of time unit in one embodiment.

FIG. 2B illustrates SRS transmission configurations for terminal devices. In this example, the terminal devices are a user equipment (UE); the SRS transmission configurations are the configurations within the time unit of a slot; and each slot includes seven OFDM symbols. The configurations are for one-port and four-port UEs. Note that terminal devices other than UEs may also have multiple antenna ports, and embodiments of invention described below regarding multi-port UEs also apply to multi-port terminal devices.

The first SRS transmission configuration 252, at the left-most of FIG. 2B, is for a one-port UE. The SRS is configured for transmission at the last symbol of the slot, Symbol #6. The first SRS transmission configuration 252 is for a wide-band SRS. A wide-band SRS does not necessarily cover the entire system bandwidth, but only the entire system bandwidth of interest. In this example, the wide-band SRS covers the resource blocks (RBs) of interest. While eight RBs are illustrated as the entire bandwidth of interest, more or less RBs may be used for SRS transmission.

Note that when a RB is configured to transmit SRS, only a portion of the subcarriers within the RB is used for SRS transmission in one embodiment. For example, in a system with 50 RBs for transmission, there are 600 subcarriers (50 RB×12 subcarriers/RB=600) in one embodiment. The SRS transmission may start from subcarrier #13, and uses every alternate subcarrier up to subcarrier #587. In that way, another UE may transmit SRS starting from subcarrier #12, and use every alternate subcarrier up to subcarrier #586, and the two UE may transmit SRS using the same RBs but with different transmission combs (e.g., comb 0 or 1). Additionally, different cyclic shifts allow multiple UEs (e.g., up to 8 UEs) at the same subframe and frequency resources to transmit SRS orthogonal to each other in one embodiment. By using transmission comb/cyclic shift, a network device may multiplex multiple UEs (e.g., 2 transmission comb selections×8 cyclic shift selections=16) for SRS transmission in one symbol in a slot.

The second SRS transmission configuration 254, at the center of FIG. 2B, is for a four-port UE using wide-band SRS transmission again. In this configuration, each UE antenna port uses one symbol within the slot to transmit SRS, thus the network device may obtain the uplink measurement of each antenna port of the UE.

The third SRS transmission configuration 256, at the right of FIG. 2B, is for a one-port UE using frequency hopping. While the wide-band SRS transmission is advantageous in that the network device may learn the entire bandwidth of interest of the uplink from the UE to the network device from the wide-band SRS transmission, a UE at a cell edge may not have sufficient power to sound over the entire bandwidth of interest of the uplink. In that case and other cases that a UE does not have sufficient power for the wide-band SRS transmission, the network device may configure the UE to use frequency hopping for SRS transmission.

In this example, the frequency hopping for UE SRS transmission is configured to transmit in two RBs per symbol from Symbol #3 to #6 in the slot. The configured RBs are in consecutive RBs within a symbol and sequential numbered RBs between adjacent symbols. This configuration maintains frequency range continuity in SRS transmission and may be more efficient.

Note that SRS is referred to as being transmitted using a symbol within a slot. The SRS may be transmitted in the same symbol position in the following slots. For example, a SRS is transmitted at symbol #6 in slot #0 in a radio frame, the SRS will always be transmitted at symbol #6 in the following slots within the radio frame, not any other symbol position within the radio frame. Yet SRS transmission may not happen at that symbol position for each slot or each subframe of the radio frame. For example, the SRS may be configured to be transmitted at the last symbols at slots #0-3 and #11-13 of the 20 slots (slots #0-19) within the radio frame, and no SRS transmission at the last symbols of the remaining slots within the radio frame. The selection of slots/subframes within a radio frame for SRS transmission may follow an algorithm and is not the focus of this discussion.

While FIGS. 2A-B illustrate one frame structure and associated SRS transmission configuration, the figures and related discussion are for illustration only, and different frame structures and SRS transmission configured to use different resources may be implemented. Also, a frame structure for SRS transmission may use different terms to refer to some or all level of the hierarchy.

Figure 3:
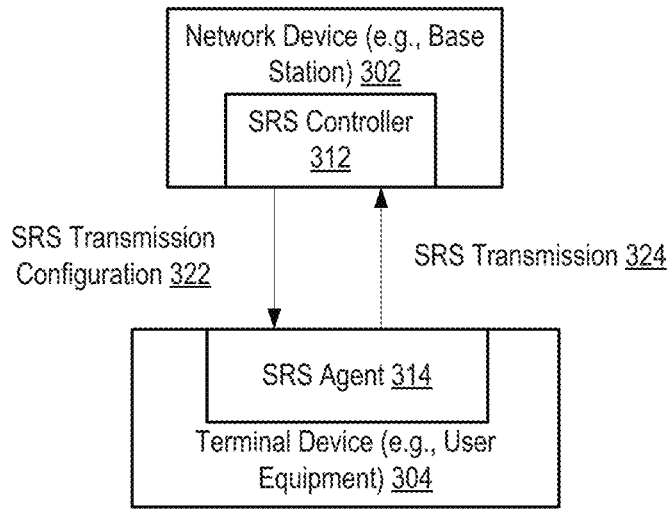
FIG. 3 illustrates SRS transmission between a network device and a terminal device per one embodiment of the invention.

FIG. 3 illustrates SRS transmission between a network device and a terminal device per one embodiment of the invention. The wireless communication network 300 includes a network device 302 and a terminal device 304. The network device 302 transmits a SRS transmission configuration 322 to the terminal device 304, and the terminal device 304 performs SRS transmission 324 and sends SRS to the network device 302. The module that manages SRS configuration at the network device 302 is a SRS controller 312, while the module that manages SRS transmission at the terminal device 304 is a SRS agent 314. While in one embodiment the SRS controller 312 and the SRS agent 314 are implemented in hardware (ASIC, FPGA, and/or other electronic circuitry), in an alternative embodiment, both or one of them are implemented in software.

Figure 4:
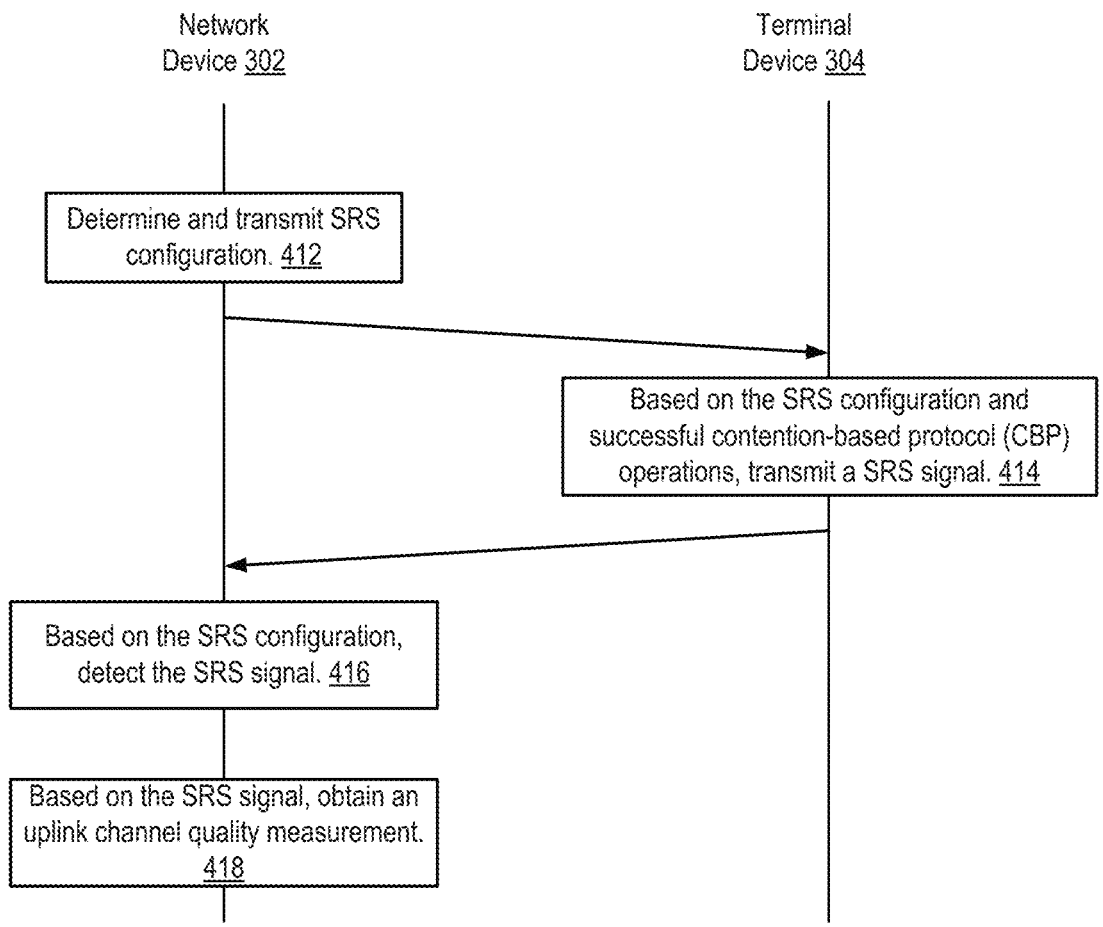
FIG. 4 illustrates operations and signal exchanges of a network device and a terminal device for SRS transmission per one embodiment of the invention.

FIG. 4 illustrates operations and signal exchanges of a network device and a terminal device for SRS transmission per one embodiment of the invention. At reference 412, the network device determines and transmits a SRS configuration to the terminal device 304. The SRS configuration is transmitted through RRC signaling (e.g., including SRS transmission trigger), medium access control (MAC) control element (CE) signaling, and/or dynamic signaling in some embodiments, and the SRS configuration is predefined in an alternative embodiment.

At reference 414, based on the SRS configuration and successful contention-based protocol operations (e.g., a successful LBT), the terminal device 304 transmits a SRS signal.

At reference 416, the network device 302 detects the SRS signal based on the SRS configuration that it sent to the terminal device 304. At reference 418, based on the SRS signal, the network device 302 obtains uplink measurements from the terminal device 304 to the network device 302. The uplink measurements may include channel quality measurements, which may include channel interference measurements. Based on the channel quality measurements, the network device 302 may determine the best bandwidth for the terminal device 304 to use for communications with the network device 302.

One commonality of SRS transmission configurations discussed so far is that the configurations are singular, and one SRS transmission configuration dictates only one set of resources (such as a single symbol in a slot within a radio frame) to be used for SRS transmission. Such singular configuration is efficient when the resources are pre-configured and allocated, and SRS transmission does not need to compete and obtain resources to perform the transmission.

Yet in a scenario where resources are shared such as in the unlicensed spectrum, SRS transmission is contingent on not only SRS configuration, but also a success in a contention-based protocol (CBP) such as LBT. When a terminal device fails in LBT for the single symbol in the slot, it can't transmit a SRS within the slot according to the singular configuration, and has to wait until LBT back-off time expires, which may be one or more slots later, and to perform LBT again, failure of which causes lapse of another LBT back-off time.

Additionally, when a SRS transmission is performed on multiple ports and/or multiple frequency ranges, a LBT failure at the one port/frequency range should not prevent a terminal device to transmit a SRS at a different port/frequency range. It improves SRS transmission efficiency when the terminal device is allowed to dynamically determine its SRS transmission based on the availability resources and to transmit when LBT succeeds at some ports/frequency ranges.

Multiple Candidates for SRS Transmission

FIG. 5 illustrates alternative SRS transmission selections within one slot for one-port UE per embodiments of the invention. The SRS transmission configurations are for the one-port UE that uses wide-band SRS transmission.

The SRS transmission configuration at reference 552 has a plurality of consecutive symbol candidates (four symbols) within one slot for SRS transmission. The plurality of consecutive symbol candidates are Symbols #3-6, and such configuration allows the UE to perform LBT as many as four times to find a symbol to transmit a SRS. With the SRS configuration, the UE may achieve the shortened SRS transmission delay 174, when the first two LBT fails (e.g., LBT at Symbols #3-4) and the third LBT succeeds (e.g., LBT at Symbol #5).

The SRS transmission configuration at reference 554 also has a plurality of symbol candidates (two symbols) within one slot for SRS transmission. The difference is that the plurality of symbol candidates here are discontinuous. The UE has two opportunities to transmit a SRS upon a successful LBT: it may transmit the SRS at Symbol #3 if the LBT is successful, otherwise the UE performs the LBT at Symbol #5 again, and if the LBT is successful then, the UE transmits the SRS.

The alternative SRS selections within one slot provide multiple opportunities for a UE to find a symbol where the LBT is successful and the UE may transmit a SRS. Thus, the UE has to wait for the next slot for a SRS transmission only when the LBT at all of the alternative symbol candidates fails. The added SRS transmission opportunities makes it more likely that SRS transmission may be performed within a given time window comparing to the singular SRS transmission configuration discussed above.

FIG. 6 illustrates alternative SRS transmission selections within one slot for a multi-port UE when the number of symbol candidates is larger than or equal to the number of ports per embodiments of the invention. The SRS transmission configurations are for the multi-port UE that uses wide-band SRS transmission.

Reference 652 is the first candidate of alternative SRS transmission selection within one slot for a two-port UE, where Port #0 is to transit at Symbol #3 and Port #1 is to transmit at Symbol #4 if the LBT succeeds at Symbol #3. If the LBT fails at Symbol #3 but succeeds at Symbol #4, the two-port UE will transmit the SRS using the second candidate at reference 654, where Port #0 is to transmit at Symbol #4 and Port #1 is to transmit at Symbol #5.

When the number of symbol candidates is larger than or equal to the number of ports, SRS may sound each port for the network device using full bandwidth of interest (wide-band) as illustrated in FIG. 6. When the number of symbol candidates is less than the number of ports, however, SRS needs to sound each port for the network device using only a portion of the full bandwidth of interest (partial-band).

FIG. 7 illustrates alternative SRS transmission selections within one slot for a multi-port UE when the number of symbol candidates is less than the number of ports per embodiments of the invention.

The SRS transmission configuration at reference 752 is the first candidate of alternative SRS transmission selection within one slot for a four-port UE. Since the UE has four ports and only two symbol candidates to transmit SRS, each port may not transmit a symbol using wide-band. Instead, when the LBT succeeds at Symbol #3, Port #0 uses a portion of the RBs within Symbol #3 for SRS transmission. The subcarriers within the portion of the RBs may be used to transmit SRS (e.g., full of or selected subcarriers within subcarriers 0-299). The remaining portion within Symbol #3 (e.g., full of or selected subcarriers within subcarriers 300-599) may be used for another port (e.g., Port #1) to transmit SRS. Similarly, Port #2 uses a portion of the RBs within Symbol #4 for SRS transmission (e.g., full of or selected subcarriers within subcarriers 0-299), and the remaining portion within Symbol #4 (e.g., full of or selected subcarriers within subcarriers 300-599) may be used for another port (e.g., Port #3) to transmit SRS.

The SRS transmission configuration at reference 754 is the second candidate of alternative SRS transmission selection within one slot for the four-port UE. When the LBT fails for Symbol #3, the four-port UE tries LBT for Symbol #4, and if that is successful, the second candidate will be used for SRS transmission. In that case, Port #0 uses a portion of the RBs within Symbol #4 for SRS transmission. The subcarriers within the portion of the RBs may be used to transmit SRS (e.g., full of or selected subcarriers within subcarriers 0-299). The remaining portion within Symbol #4 (e.g., full of or selected subcarriers within subcarriers 300-599) may be used for another port (e.g., Port #1) to transmit SRS. Similarly, Port #2 uses a portion of the RBs within Symbol #5 for SRS transmission (e.g., full of or selected subcarriers within subcarriers 0-299), and the remaining portion within Symbol #5 (e.g., full of or selected subcarriers within subcarriers 300-599) may be used for another port (e.g., Port #3) to transmit SRS.

FIG. 8A illustrates a SRS transmission configuration table including alternative SRS transmission selections within one slot for a multi-port UE when the number of symbol candidates is larger than or equal to the number of ports per embodiments of the invention. In the SRS transmission configuration table 802, SRS transmission selection #1 is for using Symbol #3 to transmit SRS through Port #0 and using Symbol #4 to transmit SRS through Port #1. Selection #1 may be used when, for example, the LBT succeeds for Symbol #3. Similarly, SRS transmission selection #2 is for using Symbol #4 to transmit SRS through Port #0 and using Symbol #5 to transmit SRS through Port #1. Selection #2 may be used when, for example, the LBT fails for Symbol #3 but succeeds for Symbol #4. The SRS transmission configuration table 802 matches the SRS transmission configuration in FIG. 6.

FIG. 8B illustrates a SRS transmission configuration table including alternative SRS transmission selections within one slot for a multi-port UE when the number of symbol candidates is less than the number of ports per embodiments of the invention. In the SRS transmission configuration table 804, each SRS transmission selection for each port include a group of subcarriers within a symbol. Note that a group of subcarriers only designates the subcarriers to be used for the SRS transmission from the group, not all the subcarriers within the group will be used for the SRS transmission. Selection #1 is for using Symbol #3 subcarriers 0-299 to transmit SRS through Port #0, using Symbol #3 subcarriers 300-599 to transmit SRS through Port #1, using Symbol #4 subcarriers 0-299 to transmit SRS through Port #2, using Symbol #4 subcarriers 300-599 to transmit SRS through Port #3. Selection #1 may be used when, for example, the LBT succeeds for Symbol #3. Selection #2 is for using Symbol #4 subcarriers 0-299 to transmit SRS through Port #0, using Symbol #4 subcarriers 300-599 to transmit SRS through Port #1, using Symbol #5 subcarriers 0-299 to transmit SRS through Port #2, using Symbol #5 subcarriers 300-599 to transmit SRS through Port #3. The SRS transmission configuration table 802 matches the SRS transmission configuration in FIG. 7.

Note that while the FIGS. 5-8 illustrates the multiple alternative SRS transmission selections are defined within a slot of a radio frame, embodiments of the invention are not limited to this granularity of transmission selection. For example, the multiple alternative SRS transmission selections may be defined within a subframe of the radio frame. In addition, the multiple alternative SRS transmission selections may be defined for a different signal transmission hierarchy.

Flow Diagrams: Multiple Candidates for SRS Transmission

The operations in the flow diagram will be described with reference to the exemplary embodiments of the other figures. However, the operations of the flow diagram can be performed by embodiments of the invention other than those discussed with reference to the other figures, and the embodiments of the invention discussed with reference to these other figures can perform operations different than those discussed with reference to the flow diagram.

Figure 9:
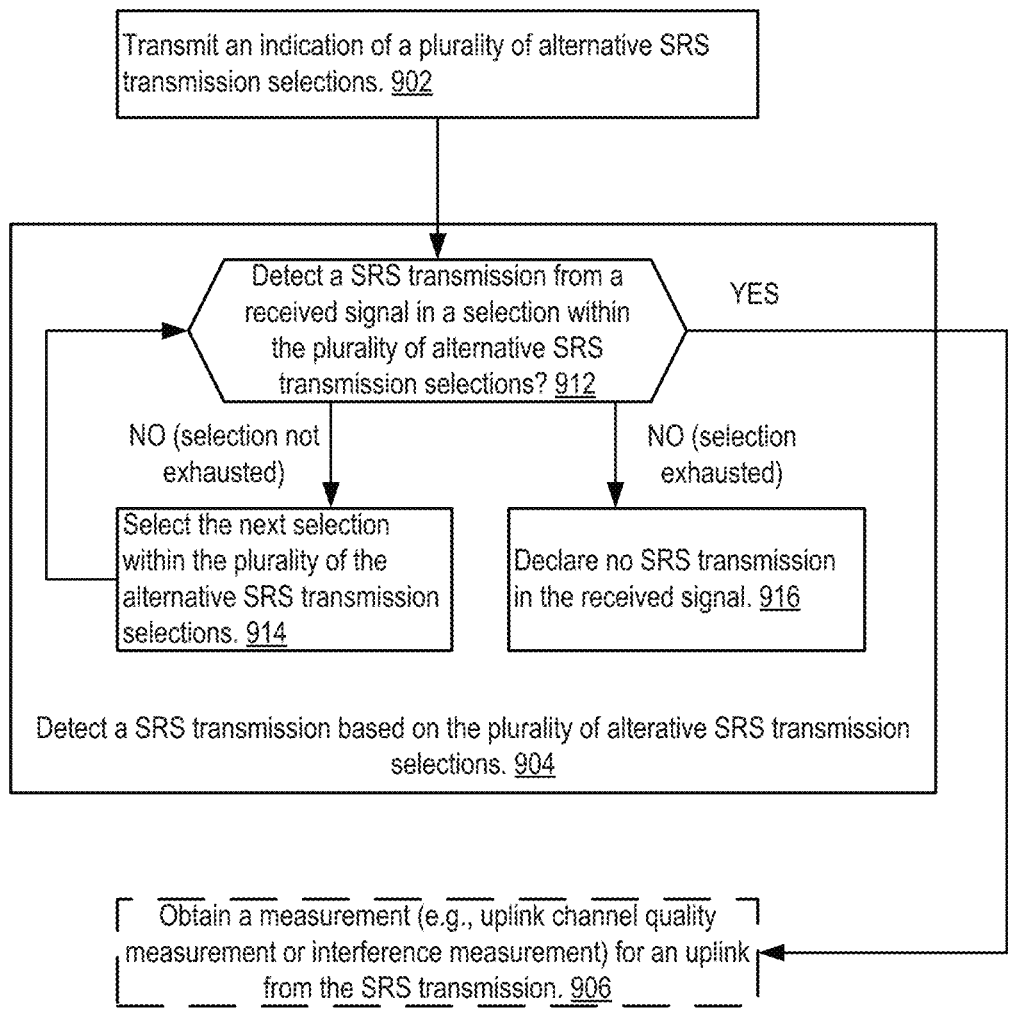
FIG. 9 is a flow diagram illustrating the operations of a network device for configuring multiple candidates of SRS transmission and detecting SRS transmission per one embodiment of the invention.

FIG. 9 is a flow diagram illustrating the operations of a network device for configuring multiple candidates of SRS transmission and detecting SRS transmission per one embodiment of the invention. The operations of method 900 may be performed by a network device such as the network device 302. The SRS transmission is for the uplink from a terminal device such as the terminal device 304 to the network device.

At reference 902, the network device transmits to the terminal device an indication of a plurality of alternative SRS transmission selections. The indication of the plurality of alternative SRS transmission selections may be transmitted through RRC signaling (e.g., including SRS transmission trigger), medium access control (MAC) control element (CE) signaling, and/or dynamic signaling in some embodiments. The indication may indicate alternative SRS transmission selections such as ones illustrated in the SRS transmission configuration tables of FIGS. 8A-B. The indication may also contain other configuration information.

One of the plurality of alternative SRS transmission selections indicts one or more symbols in a time unit through which the SRS is to be transmitted in one embodiment. In one embodiment, the time unit is a slot or a subframe of a radio frame as discussed herein above relating to FIG. 2A. In one embodiment, the plurality of alternative SRS transmission selections includes consecutive symbols in a time unit through which the SRS is to be transmitted. In one embodiment, one of the plurality of alternative SRS transmission selections indicts one or more subcarriers in frequency domain within a symbol through which the SRS is to be transmitted. For example, FIG. 7 illustrates such indication of subcarriers in frequency domain in one embodiment.

In one embodiment, the plurality of the alternative SRS transmission selections are selected based on configuration of the terminal device. For example, the plurality of the alternative SRS transmission selections may be selected based on the number of antenna ports of the terminal device.

At reference 904, the network device detects a SRS transmission based on the plurality of alternative SRS transmission selections from a signal of the terminal device. In one embodiment, the detection of the SRS transmission from the signal comprises examining existence of a SRS transmission selection within the plurality of alternative SRS transmission selections ordered in time or frequency domain. The existence of a SRS transmission selection may be determined based on that the signal energy level is over a threshold at an expected SRS transmission selection.

The operations at reference 904 are further divided into several steps in one embodiment. At reference 912, the network device determines whether it detects a SRS transmission from a received signal in a selection within the plurality of alternative SRS transmission selections.

If no SRS transmission is detected and all the selections within the plurality of alternative SRS transmission selections are exhausted, the flow goes to reference 916, and the network device declares no SRS transmission in the received signal. In that case, the network device needs to wait for that signal of the next time unit (e.g., another slot or subframe within the frame structure discussed above). Once that signal is received, the detection of the SRS transmission from that received signal is repeated for the plurality of alternative SRS transmission selections for the next time unit.

If no SRS transmission is detected and the selections within the plurality of alternative SRS transmission selections are not exhausted, the flow goes to reference 914, where the network device selects the next selection within the plurality of the alternative SRS transmission selections, and the flow goes back to reference 912.

If SRS transmission is detected at reference 912 in a selection within the plurality of alternative SRS transmission selections, the flow goes out of the detection stage of reference 904, and goes to reference 906. At reference 906, the network device examines the SRS transmission and obtains a measurement for the corresponding uplink from the terminal device to the network device. The measurement for the uplink may include one or more of uplink channel quality measurement(s) and interference measurement(s). In one embodiment, the obtained measurement indicates the uplink channel quality of multiple antenna ports of the terminal device. The measurement may be obtained from the channel state indication (CSI) in the SRS in one embodiment. Note that the measurement may include multiple sets of measurement data for measuring different uplink parameters.

For example, as illustrated in FIG. 5, the network device may transmit an indication of a plurality of alternative SRS transmission selections includes Symbols #3 and #5 (see the embodiment at reference 554) to a terminal device. The network device expects the terminal device to transmit its SRS through either Symbol #3 or #5. When the network device receives a signal from the terminal device, the network device determines at reference 912 that the received signal that contains a slot, and detects whether Symbol #3 of the slot includes a SRS transmission, because Symbol #3 is the first of the plurality of alternative SRS transmission selections that the network device has configured for the terminal device. If Symbol #3 does not include a SRS transmission, the flow goes to reference 914, where the next symbol candidate, Symbol #5, is selected for the network device to detect SRS transmission. After the selection, the flow goes back to reference 912.

At reference 912, if no SRS transmission is detected at Symbol #5, the flow goes to reference 916, and the network device declares that no SRS transmission is in the received signal. If a SRS transmission is detected at Symbol #5 at reference 912, however, the flow goes to reference 906, and the network device obtains the measurement of the uplink from the terminal device to the network device from the SRS transmission.

In one embodiment, the network device is one of an evolved node B (eNodeB) and a next generation node B (gNB). In one embodiment, the terminal device is a user equipment.

Figure 10:
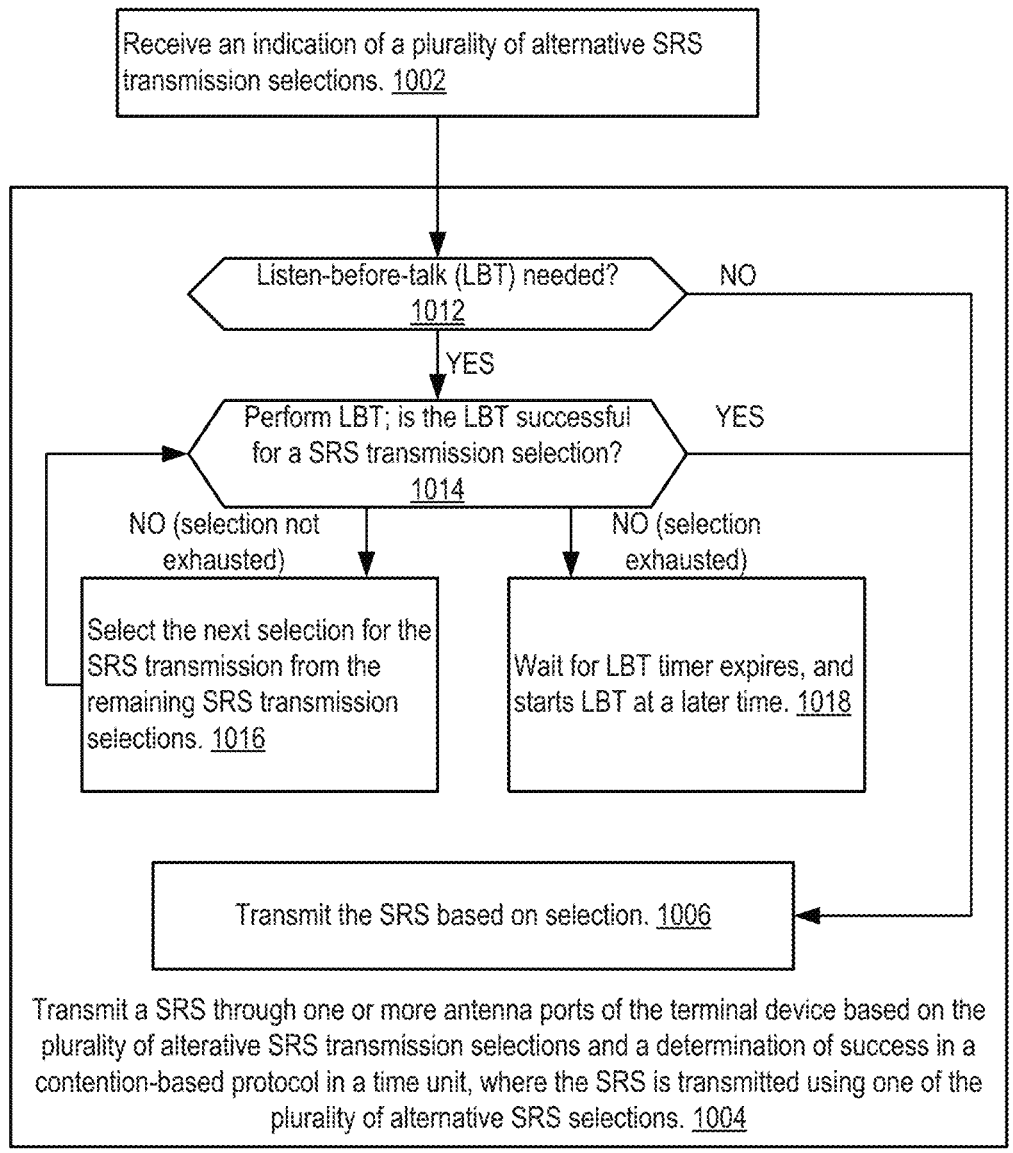
FIG. 10 is a flow diagram illustrating the operations of a terminal device with multiple candidates of SRS transmission per one embodiment of the invention.

FIG. 10 is a flow diagram illustrating the operations of a terminal device with multiple candidates of SRS transmission per one embodiment of the invention. The operations of method 1000 may be performed by a terminal device such as the terminal device 304. The SRS transmission is for the uplink from the terminal device to a network device such as the network device 302.

At reference 1002, the terminal device receives an indication of a plurality of alternative SRS transmission selections from the network device. The indication of the plurality of alternative SRS transmission selections is explained in detail relating to FIG. 9.

At reference 1004, the terminal device transmits a SRS through one or more antenna ports of the terminal device based on the plurality of alternative SRS transmission selections and a determination of success in a contention-based protocol in a time unit, where the SRS is transmitted using one of the plurality of alternative SRS selections.

In one embodiment, the determination of success in the contention-based protocol is a determination of a successful listen-before-talk (LBT). In one embodiment, a failed LBT in the time unit precedes the successful LBT in the time unit, and the failed LBT corresponds to a first alternative SRS transmission selection, and wherein the successful LBT corresponds to a second alternative SRS transmission selection immediately next to the first alternative SRS transmission selection.

In one embodiment, the operations of reference 1004 may be further divided into multiple steps. At reference 1012, the terminal device determines whether the LBT is needed, and if the LBT is not needed, the flow goes to reference 1006, where the terminal device transmits the SRS at one of the plurality of alternative SRS selections such as the first available symbol within a group of symbol candidates.

At reference 1012, if the LBT is needed, the flow goes to reference 1014, where the terminal device performs a LBT and determines whether the LBT is successful for a SRS transmission selection (e.g., the first SRS transmission selection) out of the plurality of alternative SRS selections. If the LBT is successful for the SRS transmission selection, the flow goes to reference 1006, where the terminal device transmits the SRS at the SRS selection that the LBT is successful.

At reference 1014, if the terminal device determines that the LBT fails for the SRS transmission selection, and the plurality of the alternative SRS transmission selections are not exhausted yet, the flow goes to reference 1016, where the terminal device selects the next SRS transmission selection from the remaining SRS transmission selections of the plurality of alternative SRS transmission selections. Afterward, the flow returns to reference 1014, where the LBT is performed for the selected SRS transmission selection.

At reference 1014, if the terminal device determines that the LBT fails for the SRS transmission selection again, and the plurality of the alternative SRS transmission selections are exhausted, the flow goes to reference 1018, where the network device waits for a LBT timer expires (e.g., back-off counter counting to zero). Once the LBT timer expires, likely at a different time unit (e.g., a later slot), the terminal device may perform a LBT again for a SRS transmission selection out of the plurality of alternative SRS transmission selections such as the operations at reference 1014.

For example, as illustrated in FIG. 7, a four-port UE has two symbol candidates for Port #0 to transmit SRS. For each symbol candidate, a portion of the carriers may be used to transmit the SRS in one SRS transmission selection. At reference 1002, the four-port UE receives an indication of a plurality of alternative SRS transmission selections, including two selections for Port #0, and the two selections are Symbol #3, subcarriers 0-299 and Symbol #4, subcarriers 0-299. At reference 1012, the four-port UE determines that LBT is needed. At reference 1014, the four-port UE performs the LBT for the first selection of the SRS transmission selection for Port #0, Symbol #3. If the LBT is successful, the flow goes to reference 1006, where the four-port UE transmits a SRS through Port #0 using all or portions of the subcarriers 0-299 of Symbol #3.

If the LBT fails, the flow goes to reference 1016 as the SRS transmission selections are not exhausted yet, and the next SRS transmission selection, Symbol #4, subcarriers 0-299, is selected. The flow goes back to reference 1014. If the LBT for the next SRS transmission selection is successful (e.g., the LBT for Symbol #4), the flow goes to reference 1006, where the four-port UE transmits a SRS through Port #0 using all or portions of the subcarriers 0-299 of Symbol #4. Otherwise, when the LBT for the next SRS transmission selection fails, the flow goes to reference 1018. The terminal device waits for the LBT timer to expire. Once the LBT timer expires, the terminal device likely has another slot/subframe/radio frame to transmit the SRS, and the terminal device performs LBT again for the SRS transmission selections in that slot/subframe/radio frame at reference 1014, and the process continues until a LBT succeeds and a SRS transmission is performed for the port.

In this example, a failed LBT (the LBT for Symbol #3) in a time unit (a slot) may precede the successful LBT (the LBT for Symbol #4) in the time unit, and the failed LBT corresponds to a first alternative SRS transmission selection (Symbol #3, subcarriers 0-299), and where the successful LBT corresponds to a second alternative SRS transmission selection (Symbol #4, subcarriers 0-299) immediately next to the first alternative SRS transmission selection.

In one embodiment, where the terminal device contains a plurality of antenna ports, one of the plurality of alternative SRS transmission selections indicates that one antenna port selects one symbol from multiple symbols for the SRS transmission as illustrated in FIG. 8A.

In one embodiment, where the terminal device contains a plurality of antenna ports, one of the plurality of alternative SRS transmission selections indicates that one antenna port selects one or more subcarriers within a symbol for the SRS transmission as illustrated in FIG. 8B.

In one embodiment, where the terminal device contains a plurality of antenna ports, the SRS transmission is performed only through one or more antenna ports that an associated LBT is successful.

Embodiments of the invention provides a flexible SRS transmission starting time: instead of starting at the last symbol of a slot, the SRS transmission may start at other symbols (e.g., Symbols #3-#5 in FIG. 5) of the slot in one embodiment. Additionally, a plurality of alternative SRS transmission selections are configured in a time unit (e.g., a slot or a subframe) for a terminal device to transmit SRS. The plurality of alternative SRS transmission selections may also include the selections of subcarriers, transmission combs, and/or cyclic shifts.

Through the flexible SRS transmission starting time and the plurality of alternative SRS transmission selections, embodiments of the invention increase the SRS transmission possibilities at a terminal device and the successful receiving rate at a network device, because the terminal device is given more than one chance in a time unit (e.g., a slot or a subframe) to compete for the uplink channel to transmit the SRS. The increased SRS transmission possibilities and/or successful receiving rate decrease the SRS transmission latency so that the uplink channel quality/timing estimation may be obtained more efficiently by the network device from the extracted SRS (e.g., obtaining the channel state indication, CSI). Additionally, the plurality of alternative SRS transmission selections avoids the resource waste due to contention-based protocol (CBP) failure in channel competition (e.g., LBT failure) since the impact of CBP failure is reduced with the increased SRS transmission possibilities.

Single SRS Transmission Configuration and Flexible SRS Transmission

In some embodiment, a network device provides a single SRS transmission configuration to a terminal device, and the terminal device may perform SRS transmission based on its resource availability. The network device is notified of the configuration of the terminal device such as the number of antenna port of the terminal device. The network device may indicate to the terminal device with a SRS transmission configuration on how to transmit SRS. The terminal device may, however, may transit the SRS differently from the received SRS transmission configuration. For example, the network device may configure the terminal device to transmit SRS using all four ports of the terminal device. The terminal device, after receiving the SRS transmission configuration, may decide to transmit SRS using only two out of the four ports to transmit SRS.

FIG. 11 illustrates SRS transmission for a one-port UE per embodiments of the invention. The one-port UE is configured to transmit SRS using frequency hopping. As discussed above, with frequency hopping, a UE may sound over the bandwidth in interest using multiple symbols. The one-port UE is configured to perform frequency hopping from Symbols #3 to #6.

Based on such configuration, the one-port UE may perform LBT for Symbol #3, when the LBT is successful, as illustrated at reference 1152, the SRS transmission using frequency hopping is performed. When the LBT fails for Symbol #3, as illustrated at reference 1154, instead of not transmitting SRS at all for all the frequency ranges, the UE performs LBT for Symbol #4, and if it is successful, the SRS transmission is performed starting at Symbol #4 as illustrated at reference 1154. In other words, the LBT failure for one symbol does not prevent SRS transmission using a different frequency range in frequency-hopping. At reference 1154, the SRS transmission is performed using consecutive RBs within a symbol and sequential numbered RBs between adjacent symbols as configured. Additionally, at reference 1154, for the failed LBT at Symbol #3, the SRS transmission is repeated at Symbol #6, but at a different frequency range using the first two RBs. Note that once a LBT succeeds for a symbol of a slot, no further LBT needs to be repeated for the following one or more symbols within the same slot. That is because a LBT success allows the UE to transmit in a certain continuous time period (e.g. one millisecond), which is generally equal or longer than the time period of the slot, thus the one success for the symbol of the slot allows the following one or more symbols within the slot to transmit without further listening to the uplink channel.

Similarly, at reference 1156, the LBT fails for both Symbols #3 and #4, the terminal device continues with LBT for Symbol #5, and if the LBT succeeds, the SRS transmission is performed starting at Symbol #5. Again, when the terminal device is able to do so, the SRS transmission is performed using consecutive RBs within a symbol and sequential numbered RBs between adjacent symbols as configured (e.g., Symbol #5 and #6 using resource blocks 5-6 and 7-8, respectively). When the terminal device is not able to do so, it still transmits the SRSs for the other frequency ranges at Symbol #5 and #6, using other resource blocks, e.g., resource blocks 3-4 at Symbol #5 and resource blocks 1-2 at Symbol #6.

In one embodiment, each antenna port of a multi-port UE may be scheduled to perform SRS at a certain frequency range in a SRS transmission configuration. The multi-port UE may perform SRS transmission based on its antenna port availability.

FIG. 12 illustrates SRS transmission for a multi-port UE per a first embodiment of the invention. The multi-port UE has four antenna ports, and it is configured to transmit SRS using a frequency range at each antenna port (e.g., using frequency hopping).

Based on such configuration, the four-port UE may perform LBT for Symbol #3, when the LBT is successful, as illustrated at reference 1252, the SRS transmission is performed through the configured Port #0. Assuming the LBT is successful at other antenna ports, then all four ports may transmit SRS. When one of the LBT fails at one of the antenna ports, the corresponding antenna port does not transmit SRS.

At reference 1254, the LBT fails at Symbol #3, the corresponding antenna port, port #0 does not transmit SRS, and the rest of antenna ports transmits SRS at the configured frequency ranges using the corresponding resource blocks. At reference 1256, the LBT fails at both Symbols #3 and #4, and the rest of antenna ports transmits SRS at the configured frequency ranges using the corresponding resource blocks.

The multi-port UE for FIG. 12 does not need to support multiple antenna ports to transmit simultaneously. For the multi-port UE that does support multiple antenna ports to transmit simultaneously, it has more flexibility for SRS transmission.

Figure 13:
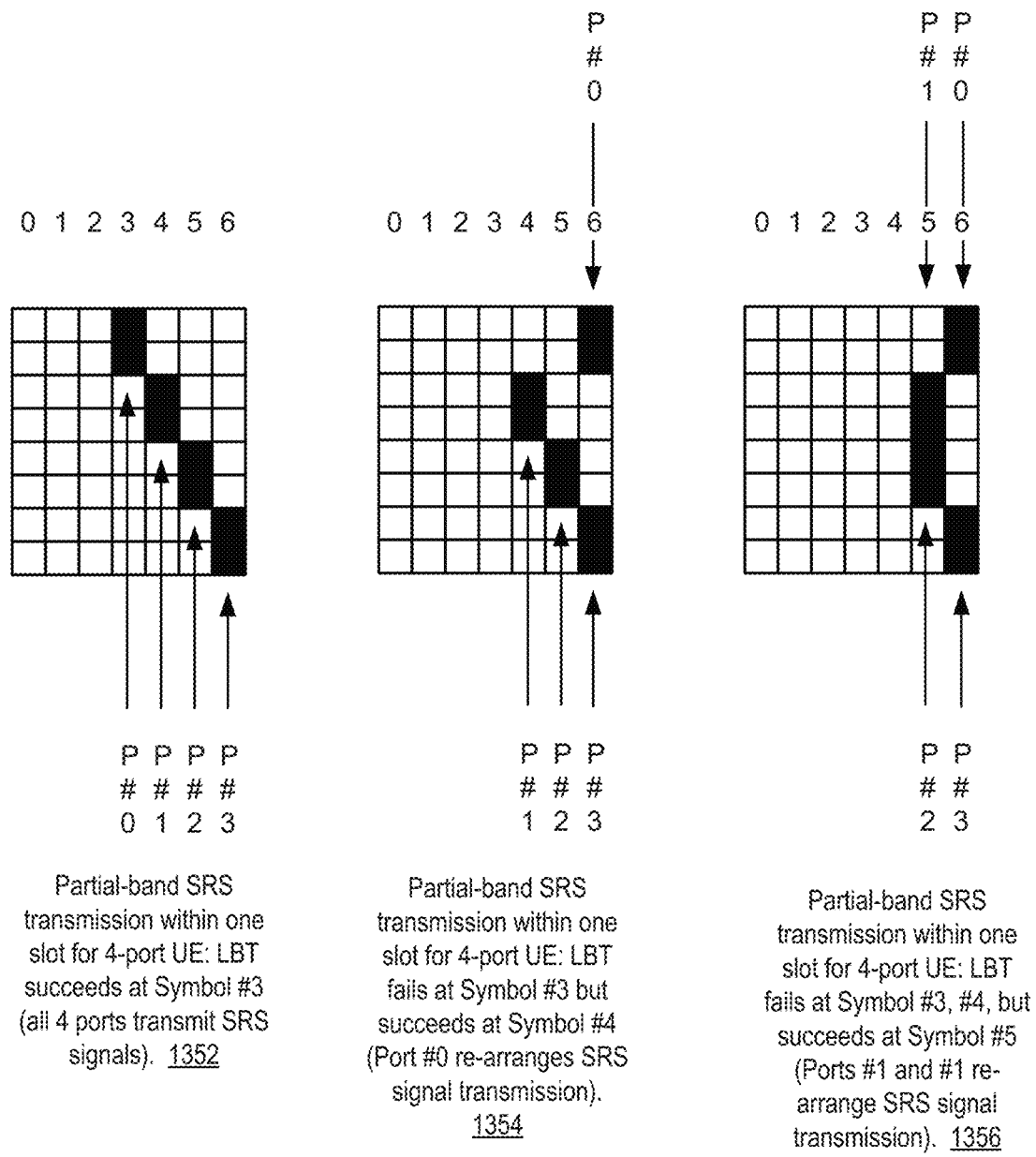
FIG. 13 illustrates SRS transmission for a multi-port UE per a second embodiment of the invention.

FIG. 13 illustrates SRS transmission for a multi-port UE per a second embodiment of the invention. The multi-port UE has four antenna ports, and it is configured to transmit SRS using a frequency range at each antenna port (e.g., using frequency hopping).

The SRS transmission illustrated at reference 1352 is similar to the ones at reference 1252, and the four-port UE may perform LBT for Symbol #3. When the LBT is successful, the SRS transmission is performed through the configured Port #0. Similarly, the LBT is successful at other antenna ports, and all four ports may transmit SRS.

At reference 1354, the LBT for Symbol #3 fails; in that case, that symbol does not transit SRS. The LBT is successful at the other antenna ports, and Ports #1-#3 transmit SRS at Symbol #4-#6 using consecutive RBs within a symbol and sequential numbered RBs between adjacent symbols as configured. Additionally, at Symbol #6, Port #0 also transmits at the frequency range that was not covered at Symbol #3 due to the LBT failure. In this case, the multi-port UE supports multiple antenna ports (Port #0 and Port #3 in this example) to transmit simultaneously at Symbol #6 using different frequency ranges.

At reference 1356, the LBT for Symbols #3 and #4 fails. Due to the failure, Symbols #3 and #4 do not transmit SRS. The LBT is successful at the remaining antenna ports, and Ports #2-#3 transmit SRS at Symbols #4-#6 using consecutive RBs within a symbol and sequential numbered RBs between adjacent symbols as configured. Additionally, at Symbols #5 and #6, Port #0 and Port #1 also transmit at the frequency ranges that were not covered at Symbols #3 and #4 due to the LBT failures. Again, the multi-port UE support multiple antenna ports (Port #0-Port #3 in this example) to transmit simultaneously at Symbols #5 and #6.

The SRS transmission illustrated at FIGS. 12 and 13 may be referred to as best-effort SRS sounding, where the multi-port UE transmits SRS with the (less than full) antenna ports that LBT succeeds. FIG. 13 applies to the multi-port UE that supports multiple antenna ports to transmit simultaneously. For a codebook based-uplink multiple input multiple output (MIMO), the best-effort SRS sounding uses available resources (e.g., resource blocks in different frequency ranges) of a terminal device to provide the network device uplink channel quality and timing information.

In a non-codebook-based uplink MIMO, a multi-port terminal device such as a multi-port UE may define its own beamforming port independent from the corresponding network device. Thus, the multi-port terminal may use wider beam adaptive to the LBT success.

Figure 14:
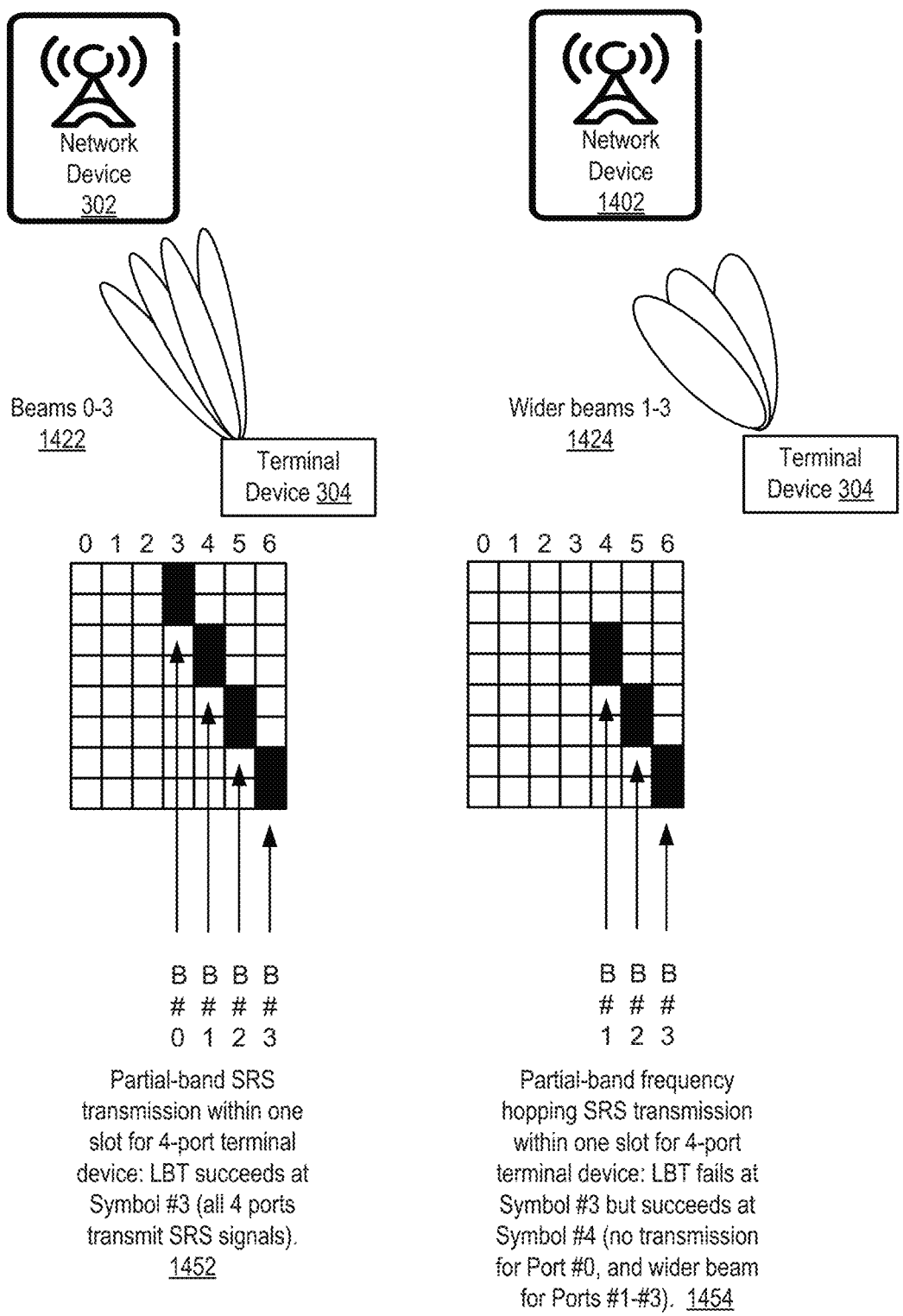
FIG. 14 illustrates SRS transmission for a multi-port terminal device in a non-codebook based uplink channel per one embodiment of the invention.

FIG. 14 illustrates SRS transmission for a multi-port terminal device in a non-codebook based uplink channel per one embodiment of the invention. The multi-port terminal device 304 has four antenna ports, and is configured to transmit SRS to a network device 302 using a frequency range at each antenna port (e.g., using frequency hopping).

At reference 1452, the four-port terminal device may transmit SRS at all four ports, assuming that LBT at these four ports succeed. The beam width of the SRS transmission at reference 1452 may be similar to the one at reference 1352, since all four ports are transmitting, the resource distribution for the SRS transmission is no different from reference 1352.

At reference 1454, one of the LBT fails (e.g., SRS to be transmitted at Symbol #3 through Port #0), the four-port terminal device may only transmit the SRS at the remaining ports (Ports #1-#3). The terminal device 304 may use resources not used by the Port #0 for the SRS transmission at Ports #1-#3. Thus, the terminal device 304 may transmit at a wider beam at one or more of the remaining ports. The terminal device 304 may use the wider beam when transmission resources are available because for non-codebook-based uplink, the beam width does not need to comply with a codebook. In this case, a wider beam is desirable for the network device 302 to detect the SRS and extract uplink measurement information.

Flow Diagrams: Single SRS Transmission Configuration and Flexible SRS Transmission The operations in the flow diagram will be described with reference to the exemplary embodiments of the other figures. However, the operations of the flow diagram can be performed by embodiments of the invention other than those discussed with reference to the other figures, and the embodiments of the invention discussed with reference to these other figures can perform operations different than those discussed with reference to the flow diagram.

Figure 15:
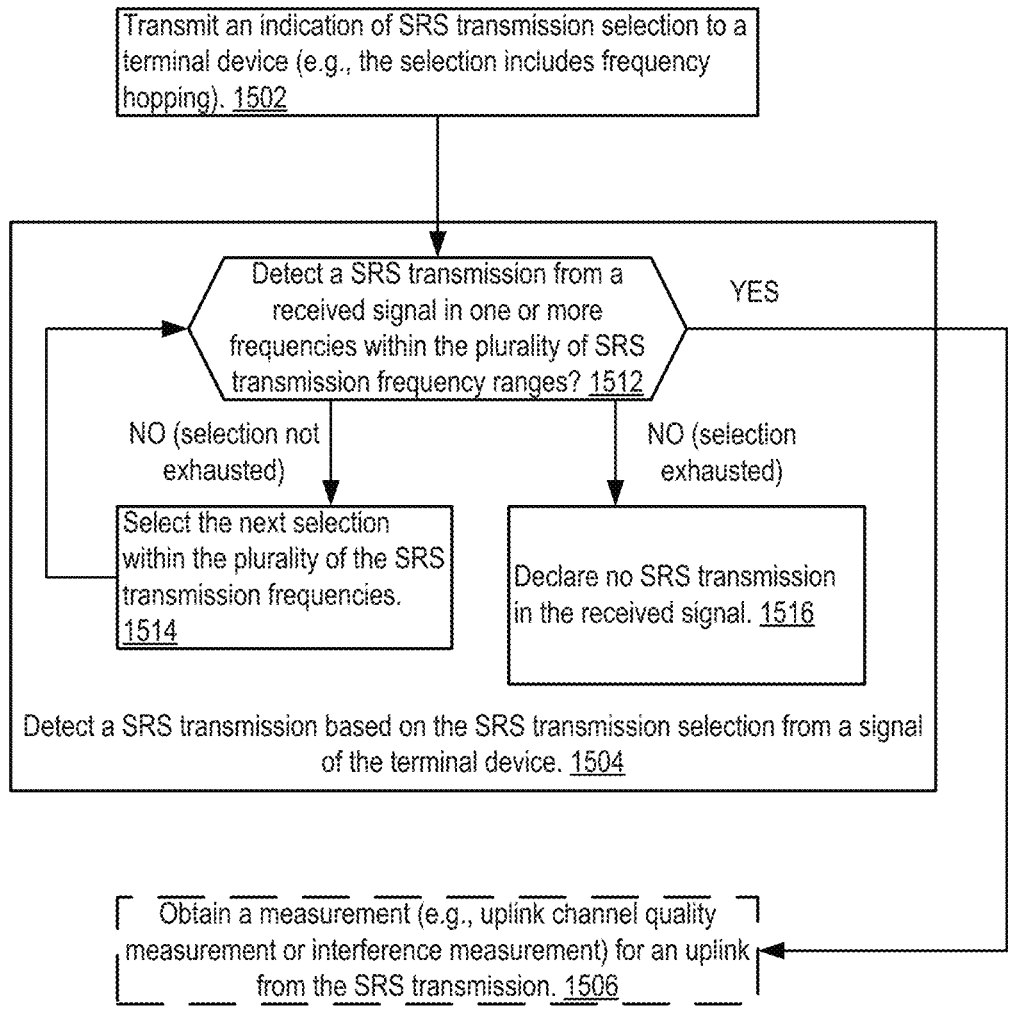
FIG. 15 is a flow diagram illustrating the operations of a network device for configuring SRS transmission and detecting SRS transmission per one embodiment of the invention.

FIG. 15 is a flow diagram illustrating the operations of a network device for configuring SRS transmission and detecting SRS transmission per one embodiment of the invention. The operations of method 1500 may be performed by a network device such as the network device 302. The SRS transmission is for the uplink from a terminal device such as the terminal device 304 to the network device.

At reference 1502, the network device transmits to the terminal device an indication of SRS transmission selection. The indication selection may be transmitted through RRC signaling (e.g., including SRS transmission trigger), medium access control (MAC) control element (CE) signaling, and/or dynamic signaling in some embodiments. The SRS transmission selection may indicate the terminal device to perform frequency hopping of a plurality of SRS transmission frequency ranges as performed at FIGS. 11-14.

At reference 1504, the network device detects a SRS transmission based on the SRS transmission selection from a signal of the terminal device. In one embodiment, the detection of the SRS transmission from the signal comprises examining existence of a SRS transmission in one or more frequency ranges, where the SRS transmission may be from one or more antenna ports of the terminal device. The existence of a SRS transmission may be determined that the signal energy level is over a threshold at one or more expected frequency ranges.

The operations at reference 1504 are further divided into several steps in one embodiment. At reference 1512, the network device determines whether it detects a SRS transmission from a received signal in one or more frequency ranges within the plurality of SRS transmission frequency ranges.

If no SRS transmission is detected and the plurality of SRS transmission frequency ranges are exhausted, the flow goes to reference 1516, and the network device declares no SRS transmission in the received signal. In that case, the network device needs to wait for that signal of the next time unit (e.g., another slot or subframe within the frame structure discussed above). Once that signal is received, the detection of the SRS transmission from that received signal is repeated at reference 1512.

If no SRS transmission is detected and the plurality of SRS transmission frequency ranges are not exhausted, the flow goes to reference 1514, where the network device selects the next frequency range within the plurality of frequency ranges, and the flow goes back to reference 1512.

If SRS transmission is detected at reference 1512, the detection may include repeated detection for (remaining) plurality of all SRS transmission frequency ranges before the flow goes to reference 1506 in one embodiment. In an alternative embodiment, the detection in one SRS transmission frequency range will cause the flow to go to reference 1506.

At reference 1506, the network device examines the SRS transmission and obtains a measurement for the corresponding uplink from the terminal device to the network device. Operations at reference 1506 are similar to the ones at reference 906, and are thus not repeated.

In one embodiment, the network device is one of an evolved node B (eNodeB) and a next generation node B (gNB). In one embodiment, the terminal device is a user equipment.

Figure 16:
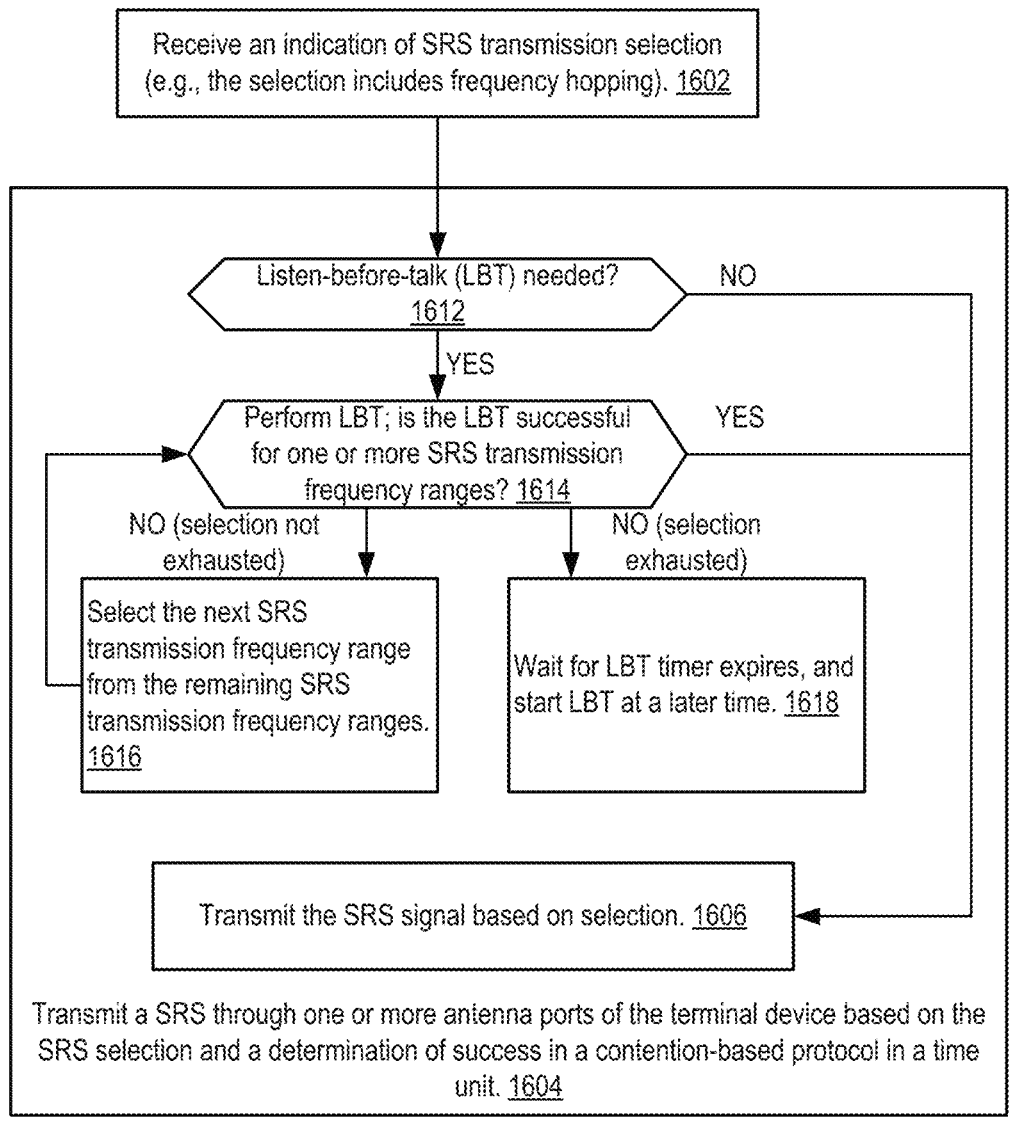
FIG. 16 is a flow diagram illustrating the operations of a terminal device with a single SRS transmission Configuration and flexible SRS transmission per one embodiment of the invention.

FIG. 16 is a flow diagram illustrating the operations of a terminal device with a single SRS transmission Configuration and flexible SRS transmission per one embodiment of the invention. The operations of method 1600 may be performed by a terminal device such as the terminal device 304. The SRS transmission is for the uplink from the terminal device to a network device such as the network device 302.

At reference 1602, the terminal device receives an indication of SRS transmission selections from the network device. The indication of the SRS transmission selections is explained in detail relating to FIG. 15. The SRS transmission selection may indicate the terminal device to perform frequency hopping of a plurality of SRS transmission frequency ranges as performed at FIGS. 11-14

At reference 1604, the terminal device transmits a SRS through one or more antenna ports of the terminal device based on the SRS selection and a determination of success in a contention-based protocol in a time unit.

In one embodiment, the determination of success in the contention-based protocol is a determination of a successful listen-before-talk (LBT). In one embodiment, a failed LBT corresponding to a frequency range uses a first symbol within the time unit, and the failed LBT causes a second symbol within the time unit to be selected to perform a LBT again corresponding to the frequency range. The time unit may be a slot or a subframe of a radio frame. In one embodiment, the second symbol within the time unit is selected to maintain frequency range continuity in the SRS transmission. For example, at reference 1154 of FIG. 11, Symbol #6 is selected to transmit SRS at the frequency range including the first two resource blocks so that the continuity of the resource blocks for transmitting at Symbols #4-#5 is maintained.

In one embodiment, the SRS is transmitted by matching the one or more antenna ports with one or more symbols that succeed in LBT as illustrated in FIGS. 11-13. In one embodiment, the SRS is transmitted with adjusted width of beams through one or more antenna ports as illustrated in FIG. 14.

In one embodiment, the operations of reference 1604 may be further divided into multiple steps. At reference 1612, the terminal device determines whether the LBT is needed, and if the LBT is not needed, the flow goes to reference 1606, where the terminal device transmits the SRS at a plurality of SRS transmission frequency ranges based on the SRS transmission selection.

At reference 1612, if the LBT is needed, the flow goes to reference 1614, where the terminal device performs a LBT and determines whether the LBT is successful for one or more SRS transmission frequency ranges. If the LBT is successful for the one or more SRS transmission frequency ranges, the flow goes to reference 1606, where the terminal device transmits the SRS at the one or more SRS transmission frequency ranges that the LBT is successful.

At reference 1614, if the terminal device determines that the LBT fails for the one or more SRS transmission frequency ranges, and the plurality of SRS transmission frequency ranges are not exhausted yet, the flow goes to reference 1616, where the terminal device selects the next SRS transmission frequency range from the remaining SRS transmission frequency ranges of the plurality of SRS transmission frequency ranges. Afterward, the flow returns to reference 1614, where the LBT is performed for the selected SRS transmission frequency range.

At reference 1614, if the terminal device determines that the LBT fails for the one or more SRS transmission frequency ranges, and the plurality of SRS transmission frequency ranges are not exhausted yet, the flow goes to reference 1618, where the network device waits for a LBT timer expires (e.g., back-off counter counting to zero). Once the LBT timer expires, likely at a different time unit (e.g., a later slot), the terminal device may perform a LBT again for a SRS transmission at one or more frequency ranges as the operations at reference 1614.

Embodiments of the invention provide flexible SRS transmission frequency ranges, so that even if LBT fails for some SRS transmission frequency ranges, other SRS transmission frequency ranges may be utilized for SRS transmission. Thus, embodiments of the invention increase the SRS transmission possibilities at a terminal device and the successful receiving rate at a network device, because the terminal device may treat frequency ranges individually for SRS transmission, thus likely more SRS transmissions may be performed. The increased SRS transmission possibilities and/or successful receiving rate decrease the SRS transmission latency so that the uplink channel quality/timing estimation may be obtained more efficiently by the network device from the extracted SRS (e.g., obtaining the channel state indication, CSI). Additionally, the plurality of alternative SRS transmission selections avoids the resource waste due to contention-based protocol (CBP) failure in channel competition (e.g., LBT failure) since the impact of CBP failure is reduced with the increased SRS transmission possibilities. Additionally, with the non-codebook based uplink MIMO, a multi-port terminal device may increase the width of beams in SRS transmission, thus increasing the detectability of the SRS at the network device and makes the SRS detection and channel/timing estimation of the network device more robust in some embodiments.

Electronic Devices Utilizing Embodiments of the Invention

Figure 17:
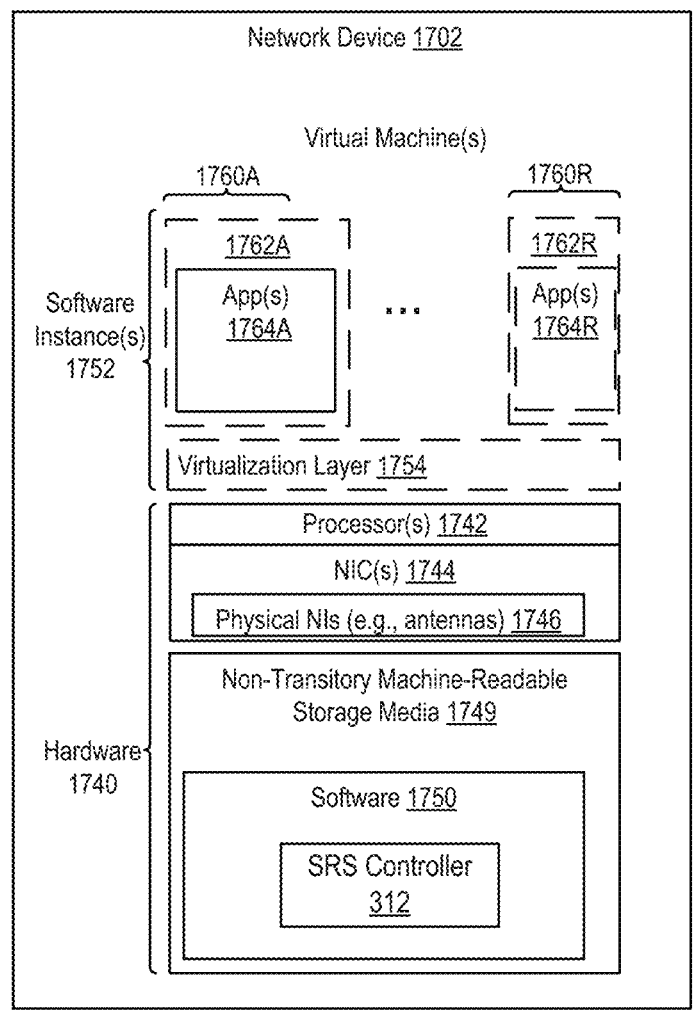
FIG. 17 illustrates a network device per one embodiment of the invention.

FIG. 17 illustrates a network device per one embodiment of the invention. The network device 1702 may be the network device 302. The network device 1702 may be implemented using custom application—specific integrated—circuits (ASICs) as processors and a special-purpose operating system (OS), or common off-the-shelf (COTS) processors and a standard OS.

The network device 1702 includes hardware 1740 comprising a set of one or more processors 1742 (which are typically COTS processors or processor cores or ASICs) and physical NIs 1746, as well as non-transitory machine-readable storage media 1749 having stored therein software 1750. During operation, the one or more processors 1742 may execute the software 1750 to instantiate one or more sets of one or more applications 1764A-R. While one embodiment does not implement virtualization, alternative embodiments may use different forms of virtualization. For example, in one such alternative embodiment the virtualization layer 1754 represents the kernel of an operating system (or a shim executing on a base operating system) that allows for the creation of multiple instances 1762A-R called software containers that may each be used to execute one (or more) of the sets of applications 1764A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment the virtualization layer 1754 represents a hypervisor (sometimes referred to as a virtual machine monitor (VMM)) or a hypervisor executing on top of a host operating system, and each of the sets of applications 1764A-R run on top of a guest operating system within an instance 1762A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1740, directly on a hypervisor (in which case the unikernel is sometimes described as running within a LibOS virtual machine), or in a software container, embodiments can be implemented fully with unikernels running directly on a hypervisor represented by virtualization layer 1754, unikernels running within software containers represented by instances 1762A-R, or as a combination of unikernels and the above-described techniques (e.g., unikernels and virtual machines both run directly on a hypervisor, unikernels and sets of applications that are run in different software containers).

The software 1750 contains the SRS controller 321 that performs operations in the exemplary method 900 described with reference to FIGS. 3-8 and the exemplary method 1500 with reference to FIGS. 11-14. The SRS controller 321 may be instantiated within the applications 1764A-R. The instantiation of the one or more sets of one or more applications 1764A-R, as well as virtualization if implemented, are collectively referred to as software instance(s) 1752. Each set of applications 1764A-R, corresponding virtualization construct (e.g., instance 1762A-R) if implemented, and that part of the hardware 1740 that executes them (be it hardware dedicated to that execution and/or time slices of hardware temporally shared), forms a separate virtual network device 1760A-R.

A network interface (NI) may be physical or virtual. In the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). The physical network interface 1746 may include one or more antenna of the network device 1702. An antenna port may or may not correspond to a physical antenna.

Figure 18:
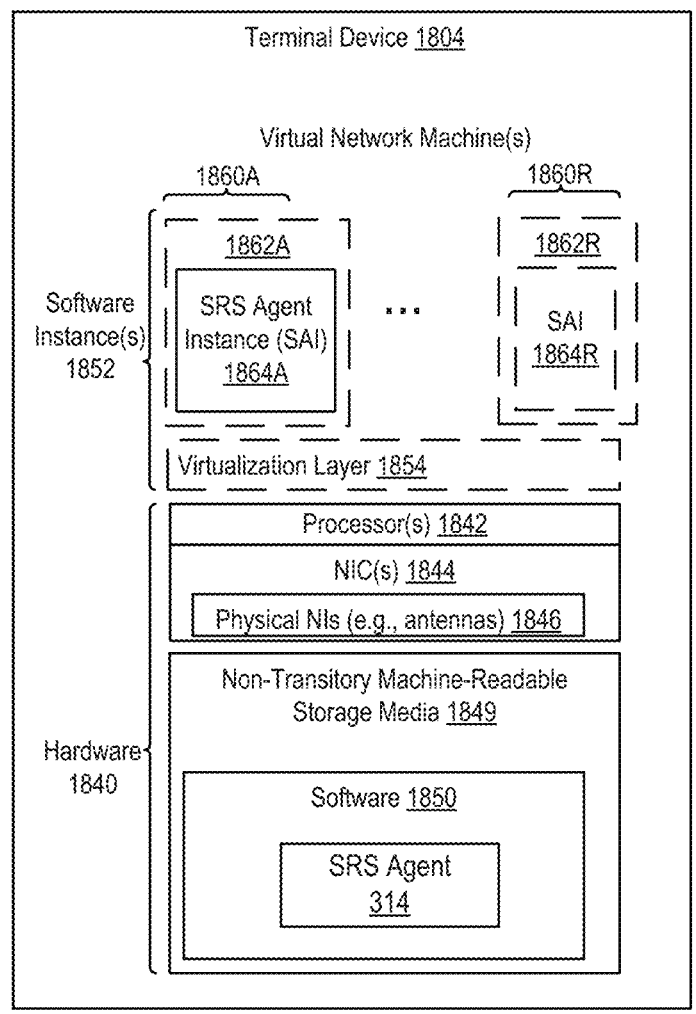
FIG. 18 illustrates a terminal device per one embodiment of the invention.

FIG. 18 illustrates a terminal device per one embodiment of the invention. The terminal device 1804 may be the terminal device 304. The terminal device 1804 as illustrated may contain similar or different hardware/software comparing to the network device 1702. The functional blocks in FIG. 18 with similar reference numbers as FIG. 17 may perform same or similar functions. Particularly, the physical network interface 1846 may include one or more antenna of the terminal device 1804, and an antenna port may or may not corresponds to a physical antenna.

The non-transitory machine-readable storage media 1849 may contain software 1850, which includes the SRS agent 314. The SRS agent 314 may perform operations in the exemplary method 1000 described with reference to FIGS. 3-8 and the exemplary method 1600 with reference to FIGS. 11-14.

Additionally, a terminal device may optionally further include input/output (I/O) devices such as display control and/or display device unit, video I/O device unit(s), audio I/O device unit(s), and other I/O device units.

Figure 19:
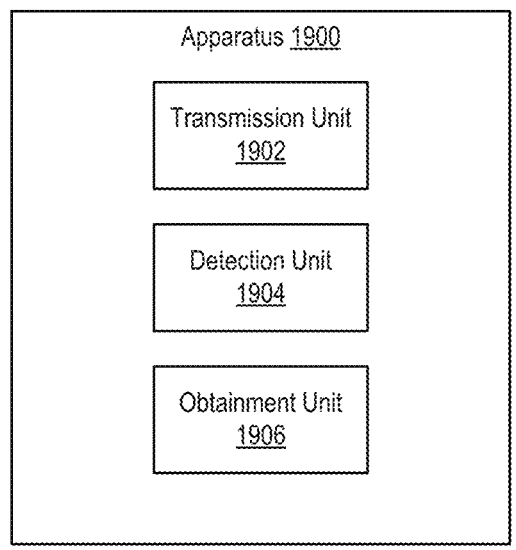
FIG. 19 illustrates a schematic block diagram of an apparatus in a wireless communication network for communicating with a terminal device per one embodiment of the invention.

FIG. 19 illustrates a schematic block diagram of an apparatus 1900 in a wireless communication network (e.g., the wireless communication network 300 shown in FIG. 3) for communicating with a terminal device (e.g., terminal device 304) per one embodiment of the invention. The apparatus may be implemented as/in a network device, e.g., the network device 302. The apparatus 1900 is operable to carry out the exemplary method 900 described with reference to FIGS. 3-8 and the exemplary method 1500 with reference to FIGS. 11-14.

The apparatus 1900 includes a transmission unit 1902, a detection unit 1904, and an obtainment unit 1906. In one embodiment, the transmission unit 1902 performs operations relating to references 902 and/or 1502; the detection unit 1904 performs operations relating to references 904/1506; and the obtainment unit 1906 perform operations relating to reference 906/1506.

Figure 20:
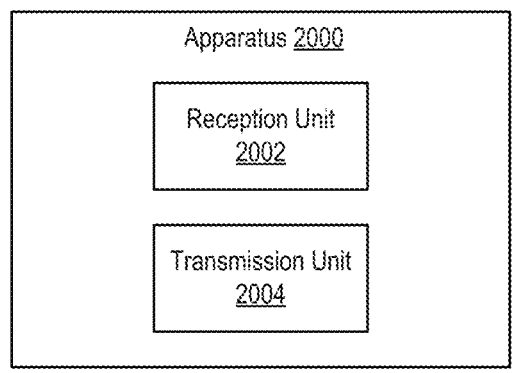
FIG. 20 illustrates a schematic block diagram of an apparatus in a wireless communication network for communicating with a network device per one embodiment of the invention.

FIG. 20 illustrates a schematic block diagram of an apparatus 2000 in a wireless communication network (e.g., the wireless communication network 300 shown in FIG. 3) for communicating with a network device (e.g., network device 302) per one embodiment of the invention. The apparatus may be implemented as/in a terminal device, e.g., the terminal device 304. The apparatus 2000 is operable to carry out the exemplary method 1000 described with reference to FIGS. 3-8 and the exemplary method 1600 with reference to FIGS. 11-14.

Some Embodiments of the Invention

Embodiments of the invention include methods of providing flexible sounding reference signal (SRS) transmission in a wireless communication network. In one embodiment, a method is implemented in a network device for configuring sounding reference signal (SRS) transmission from a terminal device to the network device, the method comprises: transmitting, by a network device to a terminal device, an indication of a plurality of alternative SRS transmission selections; and detecting, by the network device from a signal of the terminal device, a SRS transmission based on the plurality of alternative SRS transmission selections.

Regarding the method implemented in the network device, one or more embodiments may be implemented. In one embodiment, the method further comprises obtaining, by the network device, a measurement from the SRS transmission for an uplink from the terminal device to the network device. In one embodiment, one of the plurality of alternative SRS transmission selections indicts one or more symbols in a time unit through which the SRS is to be transmitted. In one embodiment, the plurality of alternative SRS transmission selections includes consecutive symbols in the time unit through which the SRS is to be transmitted. In one embodiment, the plurality of the alternative SRS transmission selections are selected based on configuration of the terminal device. In one embodiment, one of the plurality of alternative SRS transmission selections indicts one or more subcarriers in frequency domain within a symbol through which the SRS is to be transmitted. In one embodiment, the detection of the SRS transmission from the signal comprises examining existence of a SRS transmission selection within the plurality of alternative SRS transmission selections ordered in time or frequency domain. In one embodiment, the detecting comprises: determining whether the SRS transmission is detected in a first SRS transmission selection within the plurality of alternative SRS transmission selections; and upon the SRS transmission not being detected, selecting a second SRS transmission selection, immediately next to the first SRS transmission selection in order of the time or frequency domain, within the plurality of alternative SRS transmission selections.

In one embodiment, a method is implemented in a terminal device for sounding reference signal (SRS) transmission from the terminal device to a network device, the method comprising: receiving, by the terminal device from the network device, an indication of a plurality of alternative SRS transmission selections; and transmitting, by the terminal device to the network device, a SRS through one or more antenna ports of the terminal device based on the plurality of alternative SRS selections and a determination of success in a contention-based protocol in a time unit, where the SRS is transmitted using one of the plurality of alternative SRS selections.

Regarding the method implemented in the terminal device, one or more embodiments may be implemented. In one embodiment, the determination of success in the contention-based protocol is a determination of a successful listen-before-talk (LBT). In one embodiment, a failed LBT in the time unit precedes the successful LBT in the time unit, and the failed LBT corresponds to a first alternative SRS transmission selection, and where the successful LBT corresponds to a second alternative SRS transmission selection immediately next to the first alternative SRS transmission selection. In one embodiment, the terminal device contains a plurality of antenna ports, and one of the plurality of alternative SRS transmission selections indicates that one antenna port selects one symbol from multiple symbols for the SRS transmission. In one embodiment, the terminal device contains a plurality of antenna ports, and one of the plurality of alternative SRS transmission selections indicates that one antenna port selects one or more subcarriers within a symbol for the SRS transmission. In one embodiment, the terminal device contains a plurality of antenna ports, and where the SRS transmission is performed only through one or more antenna ports that an associated LBT is successful.

Embodiments of the invention include apparatus for providing flexible sounding reference signal transmission in a wireless communication network. In one embodiment, a network device is disclosed to configure sounding reference signal (SRS) transmission from a terminal device to the network device, the network device comprising: a non-transitory machine-readable storage medium to store instructions; and a processor coupled with the non-transitory machine-readable storage medium to process the stored instructions, causing the network device to perform operations. The operations are to: transmit to the terminal device, an indication of a plurality of alternative SRS transmission selections; and detect from a signal of the terminal device, a SRS transmission based on the plurality of alternative SRS transmission selections.

In one embodiment, the operations of the network device are further to: obtain a measurement from the SRS transmission for an uplink from the terminal device to the network device. In one embodiment, one of the plurality of alternative SRS transmission selections indicts one or more symbols in a time unit through which the SRS is to be transmitted. In one embodiment, the plurality of alternative SRS transmission selections are consecutive symbols in the time unit through which the SRS is to be transmitted. In one embodiment, the plurality of the alternative SRS transmission selections are selected based on configuration of the terminal device. In one embodiment, one of the plurality of alternative SRS transmission selections indicts one or more subcarriers in frequency domain within a symbol through which the SRS is to be transmitted. In one embodiment, the detection of the SRS transmission from the signal comprises examining existence of a SRS transmission selection within the plurality of alternative SRS transmission selections ordered in time or frequency domain. In one embodiment, the detection is to: determine whether the SRS transmission is detected in a first SRS transmission selection within the plurality of alternative SRS transmission selections; and upon the SRS transmission not being detected, select a second SRS transmission selection, immediately next to the first SRS transmission selection in order of the time or frequency domain, within the plurality of alternative SRS transmission selections.

In one embodiment, a terminal device is disclosed to perform sounding reference signal (SRS) transmission to a network device, the terminal device comprising: a non-transitory machine-readable storage medium to store instructions; and a processor coupled with the non-transitory machine-readable storage medium to process the stored instructions, causing the network device to perform operations. The operations are to: receive from the network device, an indication of a plurality of alternative SRS transmission selections; and transmit to the network device, a SRS through one or more antenna ports of the terminal device based on the plurality of alternative SRS selections and a determination of success in a contention-based protocol in a time unit, where the SRS is transmitted using one of the plurality of alternative SRS selections.

Regarding the terminal device, one or more embodiments may be implemented. In one embodiment, the determination of success in the contention-based protocol is a determination of a successful listen-before-talk (LBT). In one embodiment, a failed LBT in the time unit precedes the successful LBT in the time unit, and the failed LBT corresponds to a first alternative SRS transmission selection, and where the successful LBT corresponds to a second alternative SRS transmission selection immediately next to the first alternative SRS transmission selection. In one embodiment, the terminal device contains a plurality of antenna ports, and one of the plurality of alternative SRS transmission selections indicates multiple symbols for SRS transmission, each symbol corresponds to one antenna port. In one embodiment, the terminal device contains the plurality of antenna ports, and one of the plurality of alternative SRS transmission selections corresponds to one or more subcarriers within one symbol to be transmitted for the SRS transmission through an antenna port. In one embodiment, the terminal device contains the plurality of antenna ports, and where the SRS transmission is performed only through one or more antenna ports that an associated LBT is successful.

Embodiments of the invention include non-transitory machine-readable storage media for providing flexible sounding reference signal transmission in a wireless communication network. In one embodiment, a non-transitory machine-readable storage medium that provides instructions is disclose. The instructions, when executed by a processor of a network device, cause the processor to perform operations comprising: transmitting, by the network device to the terminal device, an indication of a plurality of alternative SRS transmission selections; and detecting, by the network device from a signal of the terminal device, a SRS transmission based on the plurality of alternative SRS transmission selections.

In one embodiment, a non-transitory machine-readable storage medium that provides instructions is disclose. The instructions, when executed by a processor of a network device, cause the processor to perform operations comprising: receiving, by the terminal device from the network device, an indication of a plurality of alternative SRS transmission selections; and transmitting, by the terminal device to the network device, a SRS through one or more antenna ports of the terminal device based on the plurality of alternative SRS selections and a determination of success in a contention-based protocol in a time unit, where the SRS is transmitted using one of the plurality of alternative SRS selections.

Embodiments of the invention include methods of providing flexible sounding reference signal (SRS) transmission in a wireless communication network. In one embodiment, a method is implemented for sounding reference signal (SRS) transmission from a terminal device to a network device, the method comprising: receiving (1602), by the terminal device from the network device, an indication of SRS selection; and transmitting, by the terminal device to the network device, a SRS through one or more antenna ports of the terminal device based on the SRS selection and a determination of success in a contention-based protocol in a time unit.

Regarding the method implemented in the terminal device, one or more embodiments may be implemented. In one embodiment, the determination of success in the contention-based protocol is a determination of a successful listen-before-talk (LBT). In one embodiment, the indication of SRS selection includes frequency hopping of a plurality of frequency ranges. In one embodiment, a failed LBT corresponding to a frequency range uses a first symbol within the time unit, and the failed LBT causes a second symbol within the time unit to be selected to perform a LBT again corresponding to the frequency range. In one embodiment, the second symbol within the time unit is selected to maintain frequency range continuity in the SRS transmission. In one embodiment, the SRS transmission comprises: transmitting the SRS, by matching the one or more antenna ports with one or more symbols that succeed in LBT. In one embodiment, the SRS transmission comprises: transmitting the SRS with adjusted width of beams through one or more antenna ports.

In one embodiment, a terminal device is disclosed to perform sounding reference signal (SRS) transmission to a network device, the terminal device comprising: a non-transitory machine-readable storage medium to store instructions; and a processor coupled with the non-transitory machine-readable storage medium to process the stored instructions, causing the network device to perform operations. The operations are to: receive from the network device, an indication of SRS selection; and transmit to the network device, a SRS through one or more antenna ports of the terminal device based on the indication and a determination of success in a contention-based protocol in a time unit.

Regarding the terminal device, one or more embodiments may be implemented. In one embodiment, the determination of success in the contention-based protocol is a determination of a successful listen-before-talk (LBT). In one embodiment, the indication of SRS selection includes frequency hopping of a plurality of frequency ranges. In one embodiment, a failed LBT corresponding to a frequency range uses a first symbol within the time unit, and the failed LBT causes a second symbol within the time unit to be selected to perform a LBT again corresponding to the frequency range. In one embodiment, the second symbol within the time unit is selected to maintain frequency range continuity in the SRS transmission. In one embodiment, the SRS transmission by the terminal device is to: transmit the SRS, by matching the one or more antenna ports with one or more symbols that succeed in LBT. In one embodiment, the SRS transmission by the terminal device is to: transmit the SRS with adjusted width of beams by one or more antenna ports.

In one embodiment, a non-transitory machine-readable storage medium that provides instructions is disclose. The instructions, when executed by a processor of a network device, cause the processor to perform operations comprising: receiving (1602), by the terminal device from the network device, an indication of SRS selection; and transmitting (1604), by the terminal device to the network device, a SRS through one or more antenna ports of the terminal device based on the indication and a determination of success in a contention-based protocol in a time unit.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a terminal device for sounding reference signal (SRS) transmission from the terminal device to a network device, comprising:
    receiving, by the terminal device from the network device, an indication of a plurality of alternative SRS transmission selections within a time unit, wherein the terminal device contains a plurality of antenna ports, and wherein each of the plurality of alternative SRS transmission selections indicates that, each port within the plurality of antenna ports is to use resources dedicated to the each port within the time unit for the SRS transmission; and
    transmitting, by the terminal device to the network device, an SRS through the plurality of antenna ports of the terminal device based on the plurality of alternative SRS transmission selections and a determination of success in a contention-based protocol for a first symbol in the time unit, wherein the SRS is transmitted using one of the plurality of alternative SRS transmission selections, comprising the SRS transmission in the first symbol through a first port and in a second symbol through a second port, following the success in the contention-based protocol for the first symbol.

2. The method of claim 1, wherein the determination of success in the contention-based protocol is a determination of a successful listen-before-talk (LBT).

3. The method of claim 2, wherein a failed LBT in the time unit precedes the successful LBT in the time unit, and the failed LBT corresponds to a first alternative SRS transmission selection, and wherein the successful LBT corresponds to a second alternative SRS transmission selection immediately next to the first alternative SRS transmission selection.

4. The method of claim 1, wherein one of the plurality of alternative SRS transmission selections indicates that one antenna port selects one symbol from multiple symbols for the SRS transmission.

5. The method of claim 1, wherein the one of the plurality of alternative SRS transmission selections indicates that one antenna port selects one or more subcarriers within a symbol for the SRS transmission.

6. The method of claim 2, wherein the SRS transmission is performed only through one or more antenna ports that an associated LBT is successful.

7. A method implemented for sounding reference signal (SRS) transmission from a terminal device to a network device, the method comprising:
    receiving, by the terminal device from the network device, an indication of an SRS transmission selection within a time unit, wherein the terminal device contains a plurality of antenna ports, and wherein the SRS transmission selection indicates that, each port within the plurality of antenna ports is to use resources dedicated to the each port within the time unit for the SRS transmission; and
    transmitting, by the terminal device to the network device, an SRS through the plurality of antenna ports of the terminal device based on the SRS transmission selection and a determination of success in a contention-based protocol for a first symbol in the time unit, wherein the SRS is transmitted in the first symbol through a first port of the plurality of antenna ports following the success in the contention-based protocol for a second symbol mapped to a second port of the plurality of antenna ports.

8. The method of claim 7, wherein the determination of success in the contention-based protocol is a determination of a successful listen-before-talk (LBT).

9. The method of claim 7, wherein the indication of the SRS transmission selection includes frequency hopping of a plurality of frequency ranges.

10. The method of claim 7, wherein the first and second symbols within the time unit maintain frequency range continuity in the SRS transmission.

11. The method of claim 8, wherein the SRS transmission comprises:
    transmitting the SRS, by matching each of the plurality of antenna ports with one or more symbols that succeed in LBT.

12. The method of claim 7, wherein the SRS transmission comprises:

transmitting the SRS with adjusted width of beams through the plurality of antenna ports.

13. A terminal device to perform sounding reference signal (SRS) transmission to a network device, the terminal device comprising:
   a non-transitory machine-readable storage medium to store instructions; and
   a processor coupled with the non-transitory machine-readable storage medium to process the stored instructions, causing the terminal device to:
      receive from the network device, an indication of a plurality of alternative SRS transmission selections within a time unit, wherein the terminal device contains a plurality of antenna ports, and wherein each of the plurality of alternative SRS transmission selections indicates that, each port within the plurality of antenna ports is to use resources dedicated to the each port within the time unit for the SRS transmission; and
      transmit to the network device, an SRS through the plurality of antenna ports of the terminal device based on the plurality of alternative SRS transmission selections and a determination of success in a contention-based protocol for a first symbol in the time unit, wherein the SRS is transmitted using one of the plurality of alternative SRS transmission selections, comprising the SRS transmission in the first symbol through a first port and in a second symbol through a second port of the plurality of antenna ports, following the success in the contention-based protocol for the first symbol.

14. The terminal device of claim 13, wherein the determination of success in the contention-based protocol is a determination of a successful listen-before-talk (LBT).

15. The terminal device of claim 14, wherein a failed LBT in the time unit precedes the successful LBT in the time unit, and the failed LBT corresponds to a first alternative SRS transmission selection, and wherein the successful LBT corresponds to a second alternative SRS transmission selection immediately next to the first alternative SRS transmission selection.

16. The terminal device of claim 13, wherein one of the plurality of alternative SRS transmission selections indicates multiple symbols for SRS transmission, each symbol corresponds to one antenna port.

17. The terminal device of claim 13, wherein one of the plurality of alternative SRS transmission selections corresponds to one or more subcarriers within one symbol to be transmitted for the SRS transmission through an antenna port.

18. The terminal device of claim 14, wherein the SRS transmission is performed only through one or more antenna ports that an associated LBT is successful.

19. A terminal device to perform sounding reference signal (SRS) transmission to a network device, the terminal device comprising:
   a non-transitory machine-readable storage medium to store instructions; and
   a processor coupled with the non-transitory machine-readable storage medium to process the stored instructions, causing the terminal device to:
      receive from the network device, an indication of an SRS transmission selection within a time unit, wherein the terminal device contains a plurality of antenna ports, and wherein the SRS transmission selection indicates that, each port within the plurality of antenna ports is to use resources dedicated to the each port within the time unit for the SRS transmission; and
      transmit to the network device, an SRS through the plurality of antenna ports of the terminal device based on the indication and a determination of success in a contention-based protocol for a first symbol in the time unit, wherein the SRS is transmitted in the first symbol through a first port of the plurality of antenna ports following a failure in the contention-based protocol for a second symbol mapped to a second port of the plurality of antenna ports.

20. The terminal device of claim 19, wherein the determination of success in the contention-based protocol is a determination of a successful listen-before-talk (LBT).

21. The terminal device of claim 19, wherein the indication of the SRS transmission selection includes frequency hopping of a plurality of frequency ranges.

22. The terminal device of claim 19, wherein the first and second symbols within the time unit maintain frequency range continuity in the SRS transmission.

23. The terminal device of claim 20, wherein the SRS transmission by the terminal device is to:
   transmit the SRS, by matching each of the plurality of antenna ports with one or more symbols that succeed in LBT.

24. The terminal device of claim 19, wherein the SRS transmission by the terminal device is to:
   transmit the SRS with adjusted width of beams by one or more antenna ports.

25. The terminal device of claim 13, wherein the SRS is transmitted through the second port with a beam width that is adjusted wider due to the failure in the contention-based protocol for the second port.

26. The terminal device of claim 19, wherein the SRS is transmitted, in a third symbol within the time unit, through the second port of the plurality of plurality of antenna ports after the SRS transmission through the first port.

27. The terminal device of claim 26, wherein the SRS transmission in the third symbol uses a frequency range different from that of the second symbol.

28. The terminal device of claim 19, wherein the SRS is transmitted in the first symbol through a first port of the plurality of antenna ports following a failure in the contention-based protocol for a second symbol mapped to a second port of the plurality of antenna ports.

* * * * *